(12) United States Patent
Arai

(10) Patent No.: US 9,280,475 B2
(45) Date of Patent: Mar. 8, 2016

(54) VARIABLE UPDATING DEVICE AND VARIABLE UPDATING METHOD

(71) Applicant: FUJITSU LIMITED, Kawasaki-shi, Kanagawa (JP)

(72) Inventor: Masaki Arai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 14/244,927

(22) Filed: Apr. 4, 2014

(65) Prior Publication Data

US 2014/0359214 A1 Dec. 4, 2014

(30) Foreign Application Priority Data

May 28, 2013 (JP) ................................. 2013-112017

(51) Int. Cl.
*G06F 12/08* (2006.01)
*G06F 3/06* (2006.01)

(52) U.S. Cl.
CPC .......... *G06F 12/0862* (2013.01); *G06F 3/0689* (2013.01); *G06F 12/0895* (2013.01)

(58) Field of Classification Search
CPC G06F 12/0862; G06F 3/0689; G06F 12/0895
See application file for complete search history.

(56) References Cited

U.S. PATENT DOCUMENTS

| | | | | |
|---|---|---|---|---|
| 5,434,992 A * | 7/1995 | Mattson | ............... | G06F 12/0848 711/119 |
| 6,138,213 A * | 10/2000 | McMinn | ............. | G06F 12/0862 711/118 |
| 6,532,521 B1 * | 3/2003 | Arimilli | ............. | G06F 9/30047 711/122 |
| 6,820,173 B1 * | 11/2004 | Bittel | ................. | G06F 12/0862 711/137 |
| 7,836,259 B1 * | 11/2010 | Filippo | ............... | G06F 12/0862 711/137 |
| 7,996,624 B2 * | 8/2011 | Kadambi | ............ | G06F 12/0862 711/118 |
| 8,356,142 B1 * | 1/2013 | Danilak | .............. | G06F 12/0862 711/133 |
| 2005/0086651 A1 | 4/2005 | Yamamoto et al. | | |
| 2005/0144394 A1 * | 6/2005 | Komarla | ............. | G06F 12/0862 711/137 |
| 2009/0019229 A1 * | 1/2009 | Morrow | .............. | G06F 12/0862 711/137 |
| 2009/0019266 A1 | 1/2009 | Maeda | | |

(Continued)

FOREIGN PATENT DOCUMENTS

| | | |
|---|---|---|
| JP | 2001-51965 | 2/2001 |
| JP | 2005-122481 | 5/2005 |
| JP | 2009-20696 | 1/2009 |

OTHER PUBLICATIONS

Ian Cooke, University of Chicago, C for C++ Programmers, 2001 [online] Retrieved on Sep. 4, 2015. Retrieved from the Internet <http://people.cs.uchicago.edu/~iancooke/osstuff/ccc.html>.*

*Primary Examiner* — Jared Rutz
*Assistant Examiner* — Khoa D Doan
(74) *Attorney, Agent, or Firm* — Fujitsu Patent Center

(57) ABSTRACT

A procedure, which is performed by a processor of a variable updating device, includes: (a) judging whether or not the cache set is a cache set selected in advance; (b) in a case in which the corresponding cache set is judged to be the cache set selected in advance, judging which of (1) a hit and (2) a miss has occurred; and (c) carrying out a first processing that, in a case in which it is judged that the miss has occurred, updates a miss variable that expresses a number of times that misses have occurred and stores the address information in the storage portion, and a second processing that, in a case in which it is judged that the hit has occurred, updates a hit variable that expresses a number of times that hits have occurred.

16 Claims, 29 Drawing Sheets

(56) References Cited

U.S. PATENT DOCUMENTS

| | | | | |
|---|---|---|---|---|
| 2009/0063777 A1* | 3/2009 | Usui | ............... | G06F 12/0862 711/137 |
| 2009/0254733 A1* | 10/2009 | Chen | ............... | G06F 12/0862 711/213 |
| 2012/0084513 A1* | 4/2012 | Okada | ............... | G06F 12/0862 711/133 |
| 2014/0059299 A1* | 2/2014 | Durbhakula | ........ | G06F 12/0862 711/137 |
| 2014/0164712 A1* | 6/2014 | Takamura | ............. | G06F 12/126 711/137 |
| 2014/0189204 A1* | 7/2014 | Sugimoto | ............... | G06F 3/061 711/103 |
| 2014/0289475 A1* | 9/2014 | Kokuryo | ............... | G06F 12/0804 711/133 |
| 2015/0178207 A1* | 6/2015 | Susarla | ................ | G06F 12/121 711/135 |
| 2015/0178212 A1* | 6/2015 | Takamura | ........... | G06F 12/0862 711/137 |

\* cited by examiner

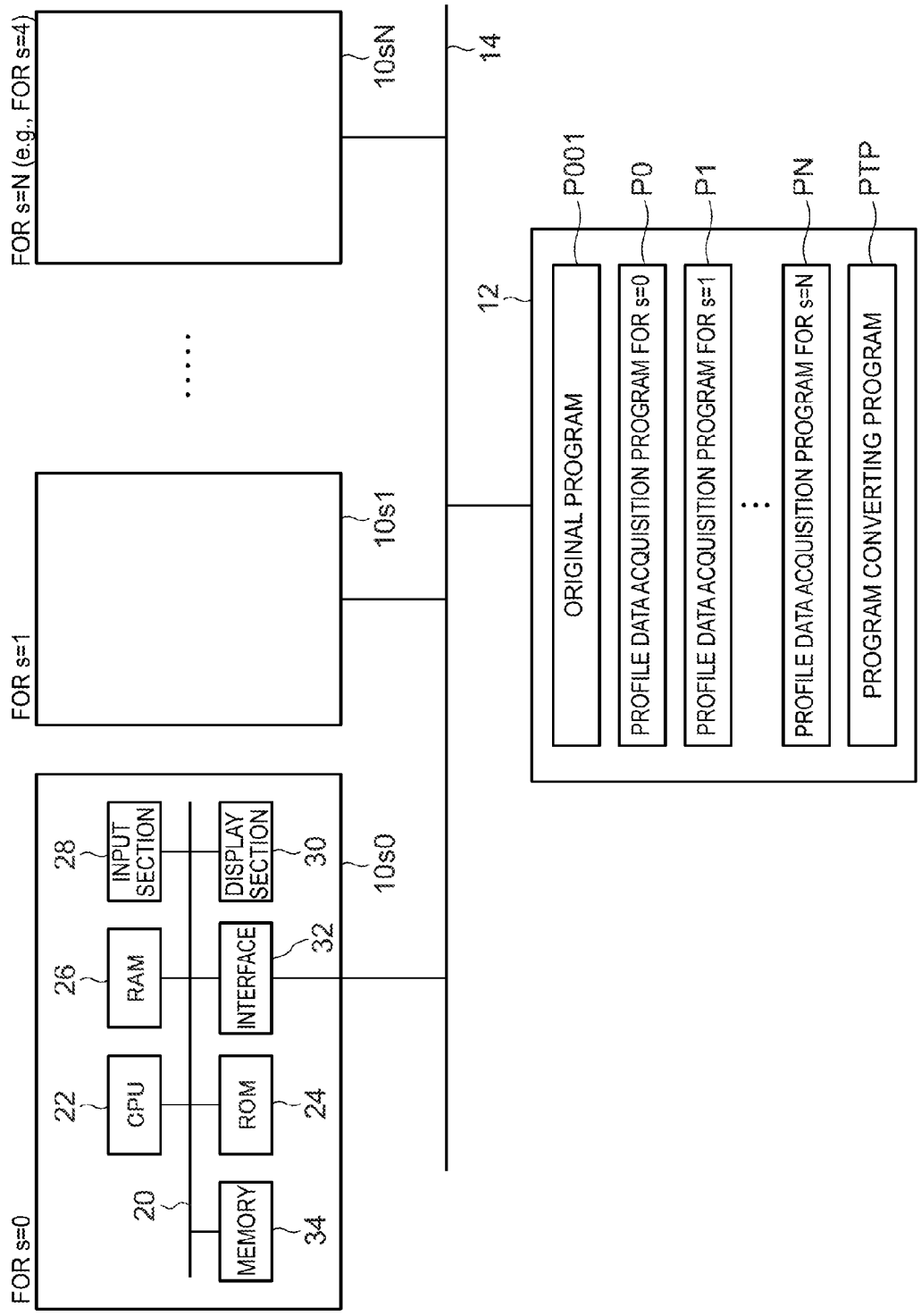

FIG. 2A

```
P001
  for (i = 0; i < N; i++) {          —— C1=Y1
    for (j = 0; j < N; j++) {        —— C2=Y1
      Z[i][j] = X[i][j] + Y[j][i];   —— C3=Y2
    }                                —— C4=Y1
  }                                  —— C5=Y1
```

FIG. 2B

STEP 66: "DETERMINE BYTE ADDRESS $m_R$ OF MAIN MEMORY THAT IS BASED ON ARRAY REFERENCE R"

STEP 66: "DETERMINE CACHE SET NUMBER $s_R$ CORRESPONDING TO ADDRESS $m_R$"

STEP 67: "IF $s_R$ IS EQUIVALENT TO VARIABLE s THAT REPRESENTS CACHE SET, EXECUTE ACCESS PROGRAM THAT REGISTERS CACHE ACCESS STATE"

FIG. 2C

PROFILE DATA ACQUISITION PROGRAM Pi

```
              s = <CACHE SET NUMBER>;        —— C1
              for (i = 0; i < N; i++) {      —— C2
                for (j = 0; j < N; j++) {
C3-1(X) ——      m0 = (0x08000 + (D2*i + j) * 8);
C3-2(X) ——      e0 = (m0 / B) % S;
C3-3(X) ——      if (e0 == s) ACCESS(m0);
C3-1(Y) ——      m1 = (0x0c000 + (D2*j + i) * 8);
C3-2(Y) ——      e1 = (m1 / B) % S;
C3-3(Y) ——      if (e1 == s) ACCESS(m1);
C3-1(Z) ——      m2 = (0x10000 + (D2*i + j) * 8);
C3-2(Z) ——      e2 = (m2 / B) % S;
C3-3(Z) ——      if (e2 == s) ACCESS(m2);
C4      ——    }
C5      ——  }
              DUMP(s);
```

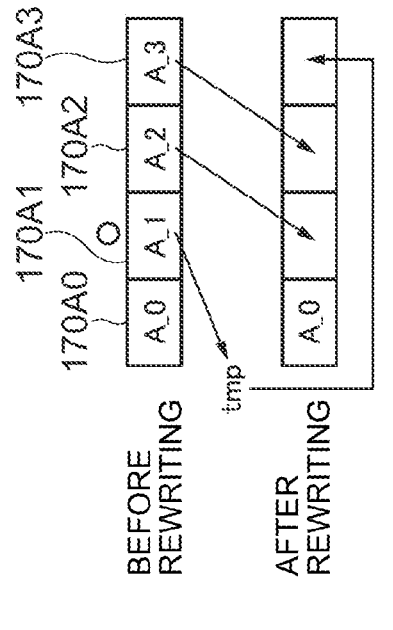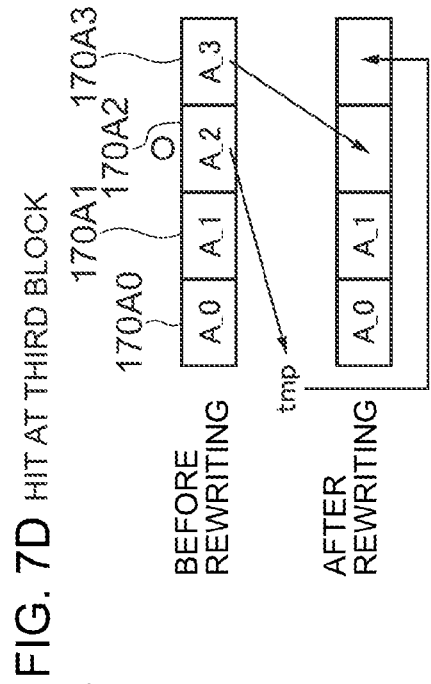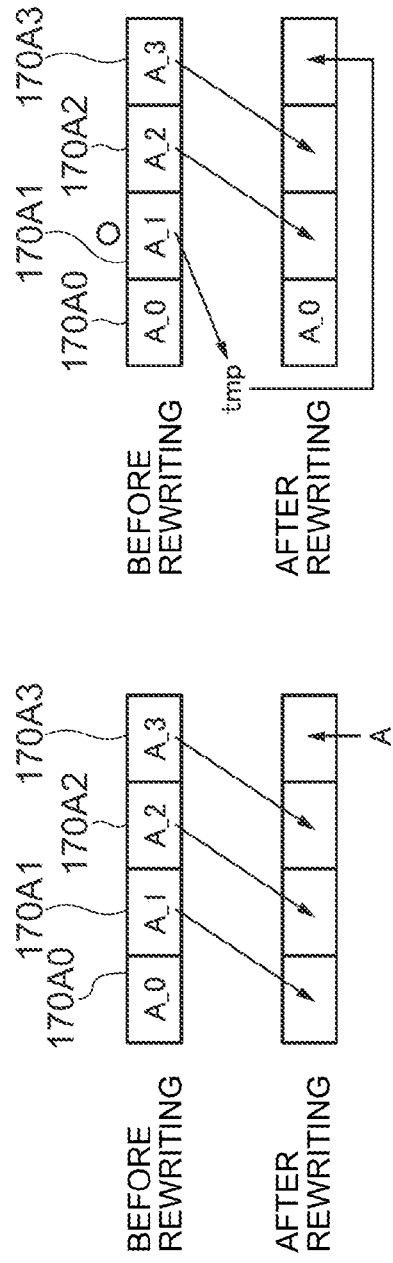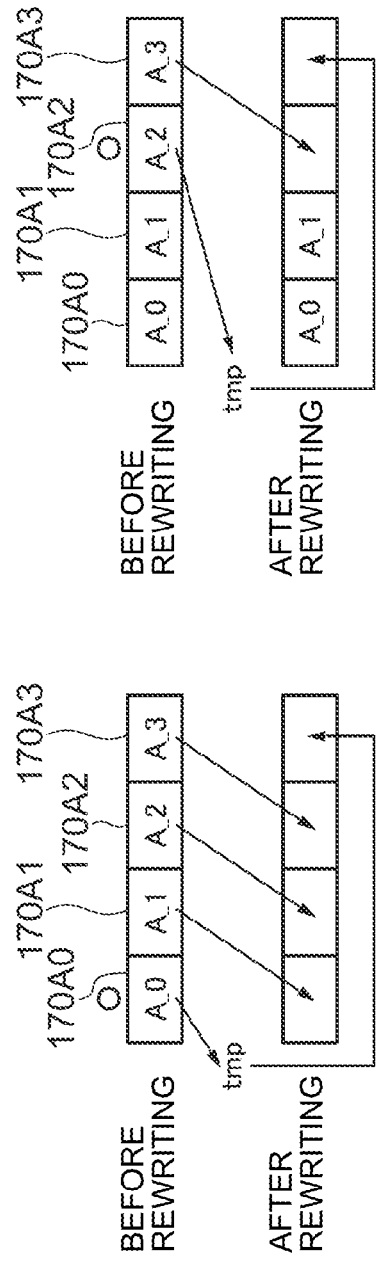

FIG. 8A

```
P002
  for (i = 0; i < N; i++) {            ——— C1=Y1
    for (j = 0; j < N; j++) {          ——— C2=Y1
      if (X[i][j] < Y[j][i]) {         ——— C6=Y3
        Z[i][j] = 0;
      }   ——— C8=Y1                    ——— C7=Y2
    }   ——— C4=Y1
  }   ——— C5=Y1
```

FIG. 8B

STEP 70: "DETERMINE BYTE ADDRESS $m_R$ OF MAIN MEMORY THAT CORRESPONDS TO ARRAY REFERENCE R"

STEP 70: "DETERMINE CACHE SET NUMBER $s_R$ CORRESPONDING TO ADDRESS $m_R$"

STEP 71: "IF $s_R$ IS EQUIVALENT TO VARIABLE s THAT REPRESENTS CACHE SET, EXECUTE ACCESS PROGRAM THAT REGISTERS THE CACHE ACCESS STATE"

STEP 73: "READ-IN CONDITION JUDGMENT RESULTS FROM FILE"

STEP 74: "JUDGE CONDITION"

FIG. 8C

PROFILE DATA ACQUISITION PROGRAM Pi

```
                s = <CACHE SET NUMBER>;        ——— C1
                for (i = 0; i < N; i++) {      ——— C2
                  for (j = 0; j < N; j++) {
C6-1(X) ——— m0 = (0x08000 + (D2*i + j) * 8);
C6-2(X) ——— e0 = (m0 / B) % S;
C6-3(X) ——— if (e0 == s) ACCESS(m0);
C6-1(Y) ——— m1 = (0x0c000 + (D2*j + i) * 8);
C6-2(Y) ——— e1 = (m1 / B) % S;
C6-3(Y) ——— if (e1 == s) ACCESS(m1);
C6-41  ——— c = <READ-IN RESULTS OF CONDITION JUDGMENT FROM FILE>;
C6-42  ——— if (c) {
C7-1(Z) ——— m2 = (0x10000 + (D2*i + j) * 8);
C7-2(Z) ——— e2 = (m2 / B) % S;
C7-3(Z) ——— if (e2 == s) ACCESS(m2);
   C8  ——— }
   C4  ——— }
   C5  ——— }
```

FIG. 20A

```
P005
    for (i = 0; i < N; i++) {              —— C1=Y1
        for (j = 0; j < N; j++) {          —— C2=Y1
            prefetch(X[i][j+64]);          —— C10=Y4
            z[i][j] = X[i][j] + Y[j][i];   —— C3=Y2
        }                                   —— C4=Y1
    }                                       —— C5=Y1
```

FIG. 20B

STEP 75: "DETERMINE BYTE ADDRESS $m_R$ OF MAIN MEMORY THAT CORRESPONDS TO ARRAY REFERENCE R"

STEP 75: "DETERMINE CACHE SET NUMBER $s_R$ CORRESPONDING TO ADDRESS $m_R$"

STEP 76: "IF $s_R$ IS EQUIVALENT TO VARIABLE s THAT REPRESENTS CACHE SET, EXECUTE ACCESS PROGRAM FOR PREFETCHING"

FIG. 20C

PROFILE DATA ACQUISITION PROGRAM Pi

```
         s = <CACHE SET NUMBER>;               —— C1
         for (i = 0; i < N; i++) {             —— C2
             for (j = 0; j < N; j++) {
C10-1  ——      mp = (0x08000 + (D2*i + j + 64) * 8);
C10-2  ——      ep = (mp / B) % S ;
C10-3  ——      if (ep == s) ACCESS(mp, 1);
C3-1(X) ——     m0 = (0x08000 + (D2*i + j) * 8);
C3-2(X) ——     e0 = (m0 / B) % S;
C3-3(X) ——     if (e0 == s) ACCESS(m0, 0);
C3-1(Y) ——     m1 = (0x0c000 + (D2*j + i) * 8);
C3-2(Y) ——     e1 = (m1 / B) % S;
C3-3(Y) ——     if (e1 == s) ACCESS(m1, 0);
C3-1(Z) ——     m2 = (0x10000 + (D2*i + j) : 8);
C3-2(Z) ——     e2 = (m2 / B) % S;
C3-3(Z) ——     if (e2 == s) ACCESS(m2, 0);
C4  ——     }
C5  ——     }
         DUMP(s);
```

FIG. 29A
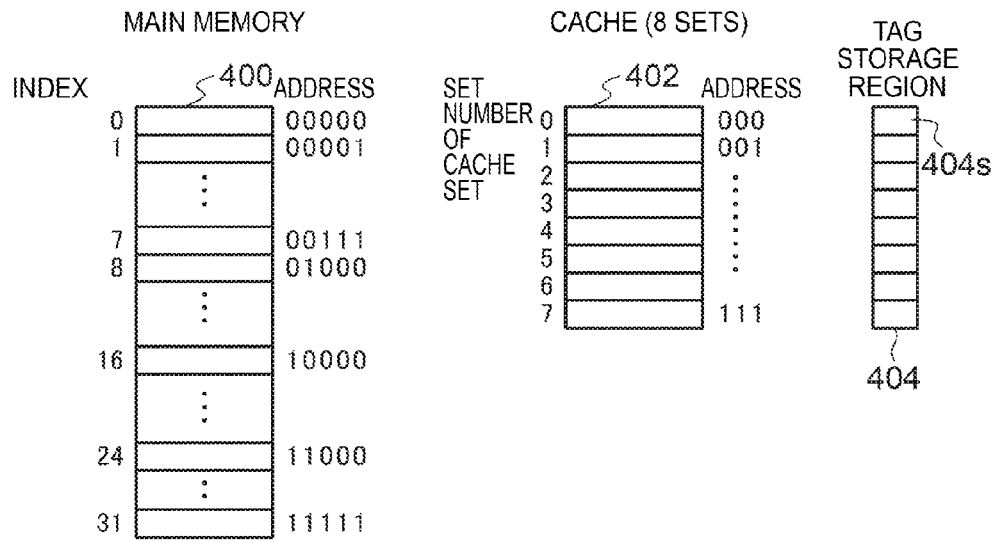
FIG. 29B
| INDEX OF MAIN MEMORY | ADDRESS OF MAIN MEMORY | | SET NUMBER OF CACHE SET | ADDRESS OF CACHE |
|---|---|---|---|---|
| 0 | 00000 | mod 8 = 0 | 0 | 000 |
| ⋮ | ⋮ | | | |
| 7 | 00111 | mod 8 = 7 | 7 | 111 |
| 8 | 01000 | mod 8 = 0 | 0 | 000 |
| ⋮ | | | | |
| 16 | 10000 | mod 8 = 0 | 0 | 000 |
| ⋮ | | | | |
| 24 | 11000 | mod 8 = 0 | 0 | 000 |
| ⋮ | | | | |
FIG. 29C
0
8
16
24
⟶ 0
FIG. 29D
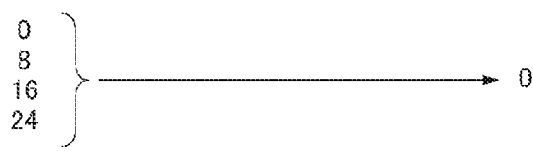
TAG (ADDRESS INFORMATION)
0   0 0
8   0 1
16  1 0
24  1 1

US 9,280,475 B2

VARIABLE UPDATING DEVICE AND VARIABLE UPDATING METHOD

CROSS-REFERENCE TO RELATED APPLICATION

This application is based upon and claims the benefit of priority of the prior Japanese Patent Application No. 2013-112017, filed on May 28, 2013, the entire contents of which are incorporated herein by reference.

FIELD

The embodiments discussed herein are related to a variable updating device and a variable updating method.

BACKGROUND

There are various forms of creating a program that causes a computer to execute the processings of acquiring data stored in memory regions of a main memory, on the basis of arrays prescribed by plural variables, and carrying out a given computation on the basis of the acquired data. For example, there is the changing of the order of variables that are to be varied, and the like. Memory regions of the main memory must be accessed when executing a program that has been created in a given form. Because accessing the memory regions of the main memory takes time, a long time is needed also until completion of execution of the program.

A cache memory is conventionally used in order to improve the time to access the main memory. The storage capacity of a cache memory is smaller than the storage capacity of a main memory, but the access time of a cache memory is shorter than the access time of a main memory. Accordingly, the processor stores data, that has been obtained by accessing the main memory, in the cache memory, and when this data must be accessed a next time, initially, the cache memory is accessed and the data is acquired. The access time is improved by accessing the cache memory and not accessing the main memory in this way.

In this way, by utilizing the cache memory, the time until completion of execution of a program can be shortened. However, there are cases in which the time until completion of execution of a program can be shortened further by changing the above-described form of the program, that was created in the above-described form, to another form.

By the way, when changing the order of variables, the order of accessing the memory regions of the main memory changes, and accordingly, the order of accessing the cache sets of the cache memory also changes. When the order of accessing the cache sets changes in this way, there are cases in which, for a given cache set, the needed data is stored (a hit) if the order of access is the previous order, whereas, due to the order being changed, the needed data is no longer stored (a miss).

Accordingly, in order to learn which way of changing the order of the variables will enable shortening of the time until completion of execution of the program, it is necessary to know the hit and miss information (profile data) for each cache set of the cache memory.

Acquisition of the profile data of all of the cache sets of a cache memory has conventionally been carried out.

RELATED PATENT DOCUMENTS

Japanese Patent Application Laid-Open (JP-A) No. 2009-20696

JP-A No. 2005-122481
JP-A No. 2001-51965

SUMMARY

According to an aspect of the embodiments, there is provided a variable updating device having: a processor; and a memory storing instructions, which, when executed by the processor perform a procedure, the procedure including: (a) with respective data of plural data that correspond respectively to any of plural memory regions of a main memory, which correspond respectively to any of cache sets of a cache memory that has the plural cache sets that are storage regions, the respective data being data that are objects of judgment, judging whether or not the cache set that corresponds to the data that is the object of judgment is a cache set selected in advance; (b) in a case in which the corresponding cache set is judged in (a) to be the cache set selected in advance, judging which of (1) a hit that expresses that address information of the memory region corresponding to the data that is the object of judgment is stored in a storage portion that is provided in correspondence with the cache set selected in advance, or (2) a miss that expresses that address information of the memory region corresponding to the data that is the object of judgment is not stored in the storage portion, has occurred; and (c) carrying out a first processing that, in a case in which it is judged in (b) that the miss has occurred, updates a miss variable that expresses a number of times that misses have occurred and stores the address information in the storage portion, or a second processing that, in a case in which it is judged that the hit has occurred, updates a hit variable that expresses a number of times that hits have occurred, or a combination of the first processing and the second processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram of a profile data acquisition system in a first embodiment.

FIG. 2A is a drawing depicting an original program, for which it is desired to acquire profile data, in the first embodiment.

FIG. 2B is a drawing depicting processing that converts the original program into profile data acquisition programs.

FIG. 2C is a drawing depicting the profile data acquisition program.

FIG. 7A is a drawing depicting the replacement situation when misses occur at all of the blocks.

FIG. 7B is a drawing depicting the replacement situation when a hit occurs at a first block.

FIG. 7C is a drawing depicting the replacement situation when a hit occurs at a second block.

FIG. 7D is a drawing depicting the replacement situation when a hit occurs at a third block.

FIG. 8A is a drawing depicting an original program, for which it is desired to acquire profile data, in a second embodiment.

FIG. 8B is a drawing depicting processing that converts the original program into profile data acquisition programs.

FIG. 8C is a drawing depicting the profile data acquisition program.

FIG. 20A is a drawing depicting an original program into which a prefetch command has been inserted, in a fifth embodiment.

FIG. 20B is a drawing depicting processing that converts the original program into profile data acquisition programs.

FIG. 20C is a drawing depicting the profile data acquisition program.

FIG. 29A is a drawing depicting the relationship between indexes and addresses of a main memory, and cache sets and addresses of a cache memory.

FIG. 29B is a drawing depicting the relationship between the addresses of the main memory and set numbers of the cache memory.

FIG. 29C is a drawing illustrating that memory regions of indexes 0, 8, 16, 24 of the main memory correspond to the set of set number 0 of the cache memory.

FIG. 29D is a drawing depicting tag information.

DESCRIPTION OF EMBODIMENTS

Figure 3:
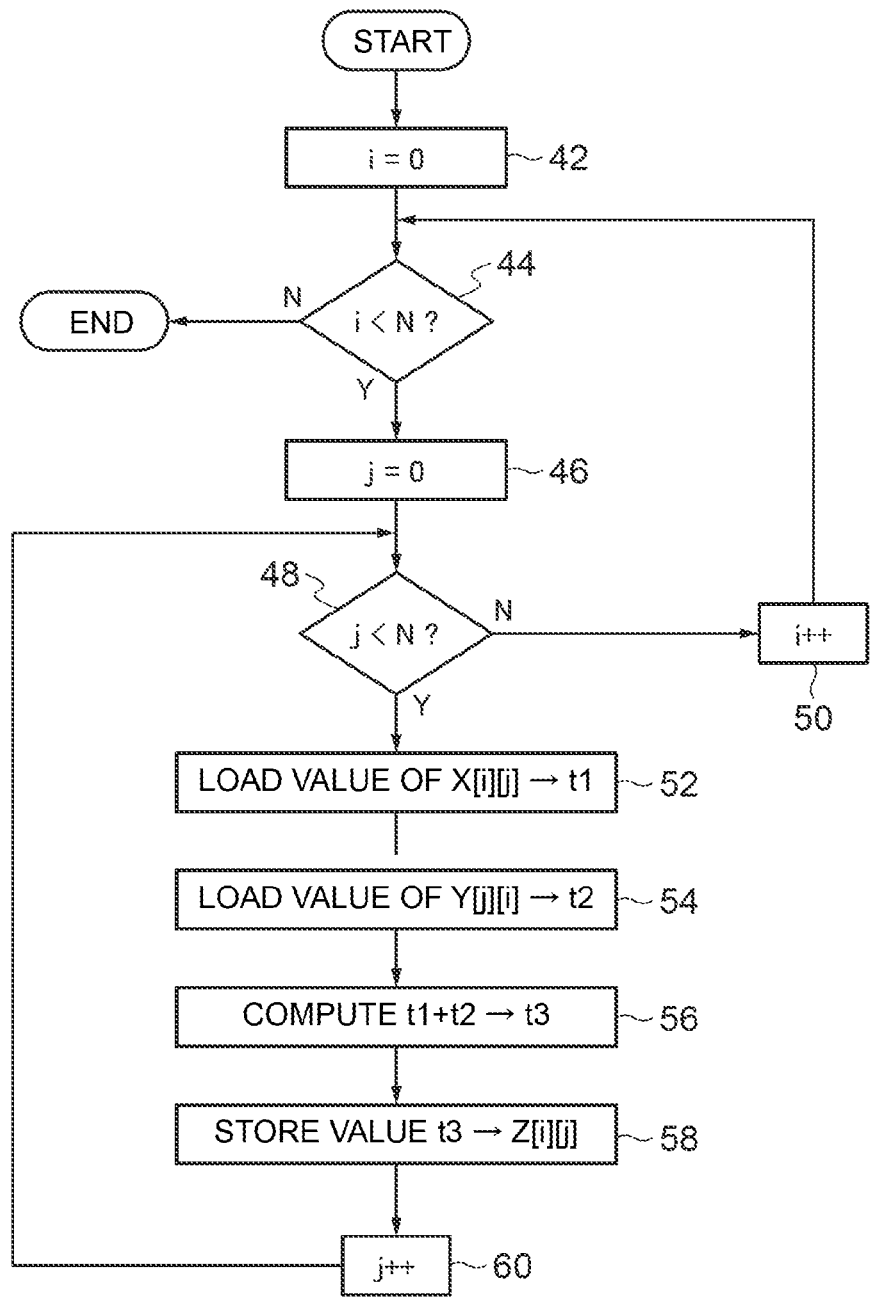
FIG. 3 is a flowchart illustrating an example of addition processing in accordance with the original program in the first embodiment.

Examples of embodiments of the disclosed technique are described in detail hereinafter with reference to the drawings.

First Embodiment

The structure of a first embodiment is described.

As illustrated in FIG. 1, a profile data acquisition system relating to a first embodiment has plural computers $10s0$, $10s1$, . . . $10sN$. These computers operate independently of one another. The computers $10s0$, $10s1$, . . . $10sN$ are connected via a network 14 to a database 12. Because the computers $10s0$, $10s1$, . . . $10sN$ have the same structure, only the computer $10s0$ is described hereinafter.

The profile data acquisition system is an example of the variable updating system of the disclosed technique. The computers $10s0$, $10s1$, . . . $10sN$ are examples of the variable updating device of the disclosed technique.

At the computer $10s0$, a CPU (Central Processing Unit) 22, a ROM (Read Only Memory) 24 and a RAM (Random Access Memory) 26 are connected to one another via a bus 20. An input section 28, a display section 30, an interface 32, and a memory 34 are also connected to the bus 20. Note that the database 12 and the other computers $10s1$ . . . $10sN$ are connected to the interface 32 via the network 14.

An original program P001, that is a program that is the object for which it is desired to acquire profile data that is hit and miss information of each cache set of the cache memory, is stored in the database 12. Hit and miss information is described here. As described above, the cache memory is used in order to improve the access time of the main memory. Namely, a relatively long time is needed in order to access the data that is stored in the memory regions of the main memory. On the other hand, a relatively short time suffices in order to access the data that is stored in the cache sets of the cache memory. When reading-out data of a memory region that the main memory has, there are cases in which the data of that memory region of the main memory is stored in the cache set, that corresponds to that memory region, of the cache memory. In this case, the data that is stored in the cache set of the cache memory can be read-out instead of reading-out the data of that memory region of the main memory. Due thereto, the time for reading-out the data can be shortened. Such a case in which the data of a memory region of the main memory is stored in the cache set of the cache memory corresponding to that memory region is called a hit. Conversely, a case in which data of a memory region of the main memory is not stored in the cache set of the cache memory corresponding to that memory region is called a miss.

For example, in accordance with a program converting program PTP that is described in detail later, the computer 10s0 converts the original program P001 into profile data acquisition programs P0 through PN that are of a number that is equal to the total number of cache sets of the cache memory. The profile data acquisition programs P0 through PN that are obtained by conversion, and the program converting program PTP, are stored in the database 12. Note that not only the computer 10s0, but also any of the other computers 10s1 . . . 10sN, or another computer that is not illustrated, may convert the original program P001 into the profile data acquisition programs P0 through PN by the program converting program PTP.

In order to acquire the profile data of the cache set whose set number is s=0 of the cache memory, the computer 10s0 downloads the profile data acquisition program P0 of s=0 from the database 12 to the RAM 26. Then, in accordance with that profile data acquisition program P0, the computer 10s0 acquires the profile data of the cache set whose set number is s=0. The same holds for the other computers as well.

Figure 27A:
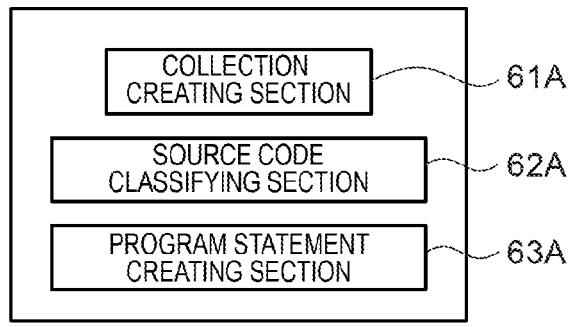
FIG. 27A is a drawing depicting an example of a program converting program in the first embodiment through the fifth embodiment.
Figure 27B:
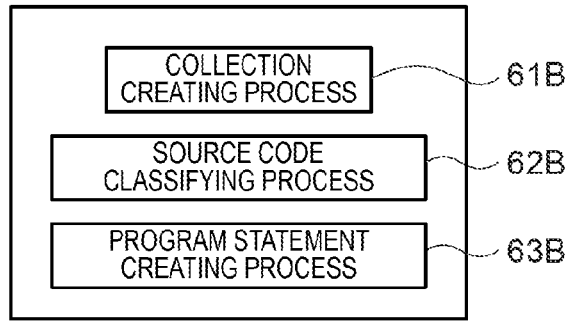
FIG. 27B is a drawing depicting an example of a program converting process.

The program converting program PTP is described next with reference to FIG. 27A. The program converting program PTP has a collection creating section 61A, a source code classifying section 62A, and a program statement creating section 63A. Further, as depicted in FIG. 27B, the program converting processing has a collection creating process 61B, a source code classifying process 62B, and a program statement creating process 63B. Note that the CPU 22 operates as the above-described respective sections 61A through 63A of FIG. 27A by executing the above-described processes 61B through 63B respectively.

Figure 28A:
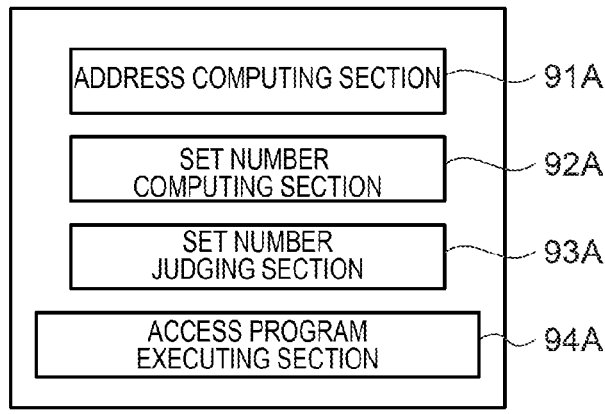
FIG. 28A is a drawing depicting an example of a profile data acquisition program in the first embodiment through the fifth embodiment.
Figure 28B:
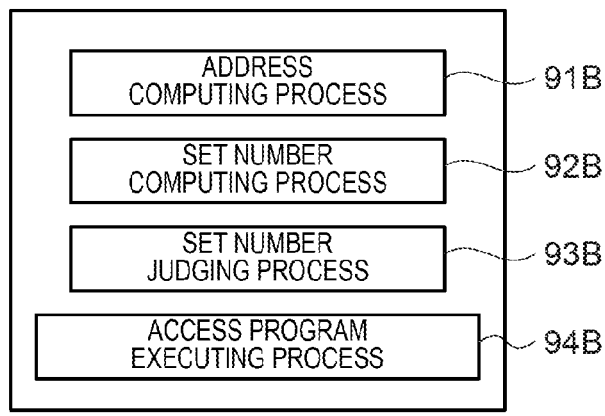
FIG. 28B is a drawing depicting an example of a profile data acquisition process.

Next, the profile data acquisition program P0 is described with reference to FIG. 28A. The profile data acquisition program P0 has an address computing section 91A, a set number computing section 92A, a set number judging section 93A, and an ACCESS program executing section 94A. Further, as depicted in FIG. 28B, the profile data acquisition processing has an address computing process 91B, a set number computing process 92B, a set number judging process 93B, and an ACCESS program executing process 94B. Note that the CPU 22 operates as the above-described respective sections 91A through 94A of FIG. 28A by executing the above-described processes 91B through 94B respectively.

Operation of the first embodiment is described next. In the technique of the first embodiment, accessing of the main memory and the cache memory is simulated. Namely, the technique of the first embodiment is not a technique of acquiring profile data by accessing the main memory and the cache memory in actuality and computing the hits or misses.

The relationship between the indexes and addresses of the respective storage regions of a main memory 400, and the set numbers and addresses of the cache sets of a cache memory, is depicted in FIG. 29. In the example illustrated in FIG. 29A, the main memory 400 has 32 memory regions. Indexes 0 through 31 are assigned to the memory regions respectively. Addresses 00000 through 11111 are assigned as the addresses of the memory regions. On the other hand, the cache memory has eight cache sets that serve as memory regions 402, and 0 through 7 are assigned as the set numbers of the cache sets. 000 through 111 are assigned as the addresses of the eight cache sets. Further, the cache memory has tag storage regions 404 that store tag information.

As described above, the main memory 400 has 32 memory regions. However, the cache memory has eight cache sets. Accordingly, one set of the cache memory is made to correspond to four different memory regions of the main memory 400. The relationship of correspondence between the addresses of the main memory and the set numbers of the cache memory is illustrated in FIG. 29B. As depicted in FIG. 29B, the remainder obtained by dividing the address of the main memory by the number of sets (eight) of the cache memory is the set number. For example, the address of index 0 of the main memory is 00000. The remainder when 00000 is divided by 8 is 0, and therefore, the set number is 0, and the address of that cache is 000. Similarly, the address corresponding to index 7 of the main memory is 00111. The remainder when 00111 is divided by 8 is 7. Accordingly, the set number is 7, and the cache address thereof is 111. Then, when the remainder is determined in the same way for each of the indexes 8, 16, 24 of the main memory, the remainder is 0, and the cache set number is 0. Accordingly, as illustrated in FIG. 29C, the memory regions of indexes 0, 8, 16, 24 of the main memory correspond to the cache set of set number 0 of the cache memory. When the processor accesses the memory region of index 0, and when the processor accesses the memory region of index 8, the respective data are stored in the cache set corresponding to set number 0 of the cache memory. The address of each cache set of the cache memory is 000. Accordingly, it is unclear that the data that is stored in that region is data that is stored in which memory region among the memory regions of indexes 0, 8, 16, 24 of the main memory. With regard to this point, as depicted in FIG. 29D, the address of the memory region of index 0 of the main memory is 00000, and the address of the memory region of index 8 is 01000, and, similarly, the addresses of indexes 16 and 24 are 10000 and 11000. The three low-order bits of these addresses correspond to the three bits of the address of the cache set number. Thus, the contents of the two high-order bits of the address of the main memory are stored as tag information in the tag region 404 that corresponds to that set. The address of the main memory is obtained from the tag information and the address of the set of the cache memory. Accordingly, data of a set of the cache memory is data corresponding to which address of the main memory, also is obtained from the tag information and the address of the set of the cache memory.

Figure 30:
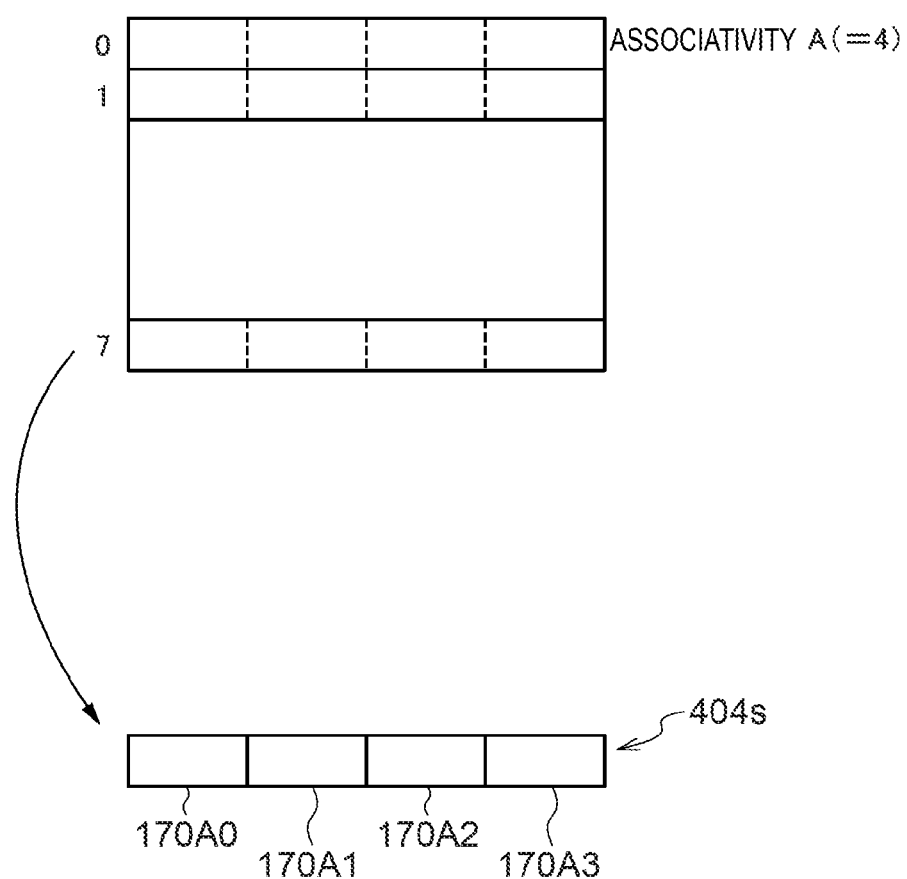
FIG. 30 is a drawing depicting the state of a cache set whose associativity is 4.

In the first embodiment, as depicted in FIG. 29A, the above-described simulation supposes the main memory 400 that has the 32 memory regions, and the cache memory that has the eight cache sets. In the first embodiment, one storage region 404s, that corresponds to cache set s, of the tag storage region 404 is provided in the memory 34. Further, as illustrated in FIG. 30, it is supposed that associativity A of the cache set is 4. Accordingly, each of the tag storage regions 404 also has four blocks. Accordingly, the one storage region 404s also has four blocks 170A0 through 170A3.

The storage region 404s is an example of the storage portion of the disclosed technique. The four blocks 170A0 through 170A3 are examples of the storage blocks of the disclosed technique.

When accessing a memory region of the main memory, in a case in which the address information of that memory region corresponds to the tag information stored in the tag storage region 404, the cache memory is accessed instead of the main memory. In the first embodiment, it suffices to be able to acquire profile data. Accordingly, it suffices to understand whether or not the tag information, that is based on the address information of that memory region, is equivalent to the tag information that is stored in the storage region 404s that corresponds to the cache set that corresponds to that memory region. Thus, the addresses of the memory regions of the main memory, and the addresses of the respective cache sets of the cache memory, are stored in the memory 34.

An example of the original program P001 that is the object for which it is desired to acquire profile data is depicted in FIG. 2A. The original program P001 is a program for executing addition processing that adds the respective values of array X and the respective values of array Y, that are identified by variables i, j respectively, and writes the sums to the memory regions of array Z that are identified by the variables i, j.

Here, the addresses of the memory regions of the main memory in which the values of X[i][j] are stored are identified by X[i][j], and the addresses of the memory regions of the main memory in which the values of Y[j][i] are stored are identified by Y[j][i]. The addresses of the memory regions of the main memory in which the values of Z[i][j] are stored are identified by Z[i][j]. The relationships between X[i][j], Y[j][i] and Z[i][j], and the addresses of the respective memory regions, are stored in the memory 34.

An example of the flow of the addition processing of the original program P001 is illustrated in FIG. 3.

As illustrated in FIG. 3, when the addition processing starts, in step 42, an executing section initializes variable i to 0, and in step 44, the executing section judges whether or not the variable i is less than a total number N of the variables i. If the variable i is less than N, in step 46, the executing section initializes variable j to 0. In step 48, the executing section judges whether or not the variable j is less than a total number N that is the total number of j. If it is judged that the variable j is less than the total number N, the addition processing is moved on to step 52. If it is judged that the variable j is not less than N, the addition processing advances to step 50 where the executing section increments the variable i by 1, and the addition processing moves on to step 44.

In step 52, the executing section reads-out the value of the array X[i][j] from the memory region that is prescribed by X[i][j], and substitutes (loads) the value in for t1. In step 54, the executing section reads-out the value of the array Y[j][i] from the memory region that is prescribed by Y[j][i], and substitutes (loads) the value in for t2. In step 56, the executing section computes t1+t2, and substitutes (loads) the obtained value in for t3. In step 58, the executing section stores the value of t3 in the memory region of the address of the main memory that is identified by array Z[i][j]. In step 60, the executing section increments the variable j by 1. After step 60, the addition processing is moved on to step 48.

Figure 4:
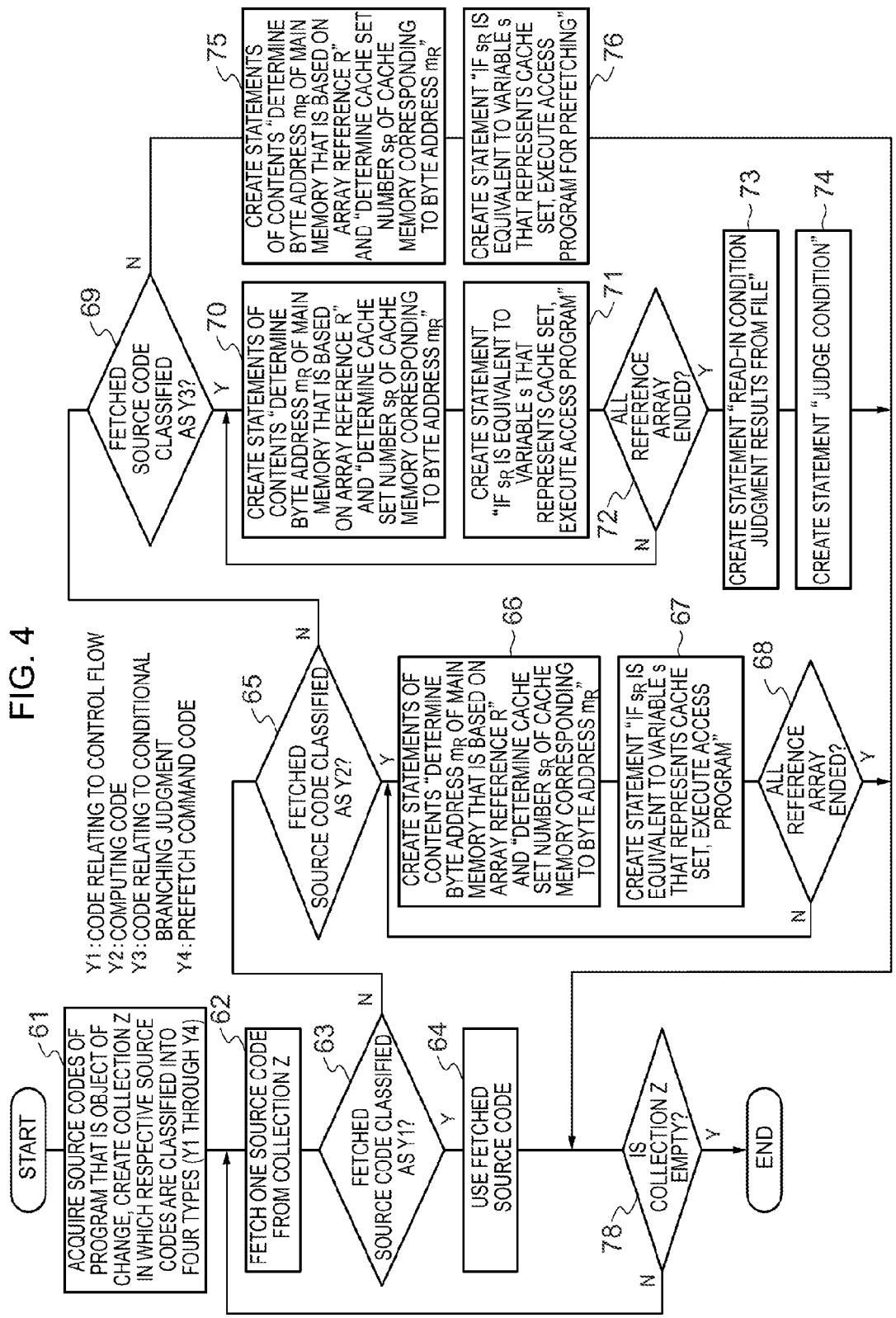
FIG. 4 is a flowchart illustrating an example of the processing that converts the original program into the profile data acquisition program in the first embodiment.

An example of the flow of program converting processing, that converts the original program into a profile data acquisition program, is illustrated in FIG. 4. In step 61, the collection creating section 61A acquires the source codes of the original program P001 (see FIG. 2A) that is the object of change, and creates collection Z in which the respective source codes are classified into, for example, four types (Y1 through Y4).

Here, Y1 is the classification of codes that relate to the control flow. Y2 is the classification of computing codes. Y3 is the classification of codes that relate to conditional branching judgments. Y4 is the classification of codes of prefetch commands.

In step 62, the source code classifying section 62A fetches, in the order of arrangement of the source codes of the original program, one source code from the collection Z, and deletes the fetched source code from the collection Z. In step 63, the program statement creating section 63A judges whether or not the fetched source code has been classified as Y1. If, in step 63, the fetched source code is judged to have been classified as Y1, in step 64, the program statement creating section 63A uses the fetched source code as a source code of the profile data acquisition program. After step 64, the program converting processing moves on to step 78.

If the results of judgment in step 63 are negative, in step 65, the program statement creating section 63A judges whether or not the fetched source code has been classified as Y2. If the results of the judgment in step 65 are affirmative, in step 66, the program statement creating section 63A creates program statements. Namely, program statements of the contents "determine byte address $m_R$ of main memory that is based on array reference R" and "determine cache set number $s_R$ of cache memory corresponding to byte address $m_R$" are created. In step 67, the program statement creating section 63A creates a program statement of the contents "if cache set number $s_R$ is equivalent to variable s that represents cache set, execute ACCESS program that stores the cache access state". In step 68, the program statement creating section 63A judges whether or not creation of the above program statements is completed for all of the arrays. If creation of the above statements is not completed for all of the arrays, the processing returns to step 66. Due thereto, the above processings (step 66 and step 67) are executed for another array. When creation of the above statements for all of the arrays is completed, the program converting processing is moved on to step 78.

If the results of judgment of step 65 are negative, in step 69, the program statement creating section 63A judges whether or not the fetched source code has been classified as Y3. If it is judged that the source code has been classified as Y3, in step 70 through step 72, the program statement generating section 63A executes processings that are similar to step 66 through step 68 respectively. In step 73, the program statement creating section 63A creates a program statement of the contents "read-in condition judgment results from file". In step 74, the program statement creating section 63A generates a program statement of the contents "judge condition". After step 74, the program converting processing is moved on to step 78.

If the results of judgment in step 69 are negative, the fetched source code has been classified as Y4. In step 75, the program statement creating section 63A executes processing similar to step 66. In step 76, the program statement creating section 63A creates a statement of the contents of "if $s_R$ is equivalent to variable s that represents cache set, execute ACCESS program for prefetching".

Note that the ACCESS program is created in advance, and, in step 67, step 71 and step 76, program statements are created such that the same ACCESS program that is created in advance is used. After step 76, the program converting processing is moved on to step 78.

In step 78, the program statement creating section 63A judges whether or not the collection Z is empty. If the results of judgment of step 78 are negative, there is a source code that has not been converted into the profile data acquisition program. Thus, the program converting processing returns to step 62, and the above-described processings (steps 62 through 78) are executed. When the results of judgment in step 78 are affirmative, all of the source codes have been converted into the profile data acquisition program, and therefore, the program converting processing ends.

The original program P001 that is depicted in FIG. 2A is converted, by the program converting processing of FIG. 4, into profile data acquisition program Pi (i=s(0 through N)) that is depicted in FIG. 2C. Concrete description thereof follows. Source codes C1 and C2 of the original program P001 depicted in FIG. 2A are classified as Y1. Accordingly, by the processing of step 64, the source codes C1 and C2 are used as is in the profile data acquisition program Pi as depicted in FIG. 2C. However, source code C3 is classified as Y2. The source code C3 in FIG. 2A has the arrays X, Y and Z as arrays. Accordingly, for each of the arrays X, Y and Z, the following program statements are created in the profile data acquisition program Pi by the processing of step 66 (see FIG. 2B as well). Namely, program statements C3-1(X), C3-2 (X), C3-1(Y), C3-2(Y), C3-1(Z) and C3-2(Z) are created. Further, for each of the arrays X, Y and Z, program statements C3-3 (X), C3-3(Y) and C3-3(Z) are created in the profile data acquisition program Pi by the processing of step 67 (see FIG. 2B as well). Note that source codes C4 and C5 in the original program P001 are classified as Y1. Accordingly, by the processing of step 64, the source codes C4 and C5 are used as is in the profile data acquisition program Pi as depicted in FIG. 2C.

A number of the profile data acquisition programs Pi, which number is equal to the number of cache sets of the cache memory, are created. The respective profile data acquisition programs Pi have substantially the same contents, but, as depicted in FIG. 2C, the variable s that represents the cache set differs. For example, s=0 in profile data acquisition program P0 that is for s=0, and s=1 in profile data acquisition program P1 that is for s=1, and s=N in profile data acquisition program PN that is for s=N as depicted in FIG. 1.

Figure 5:
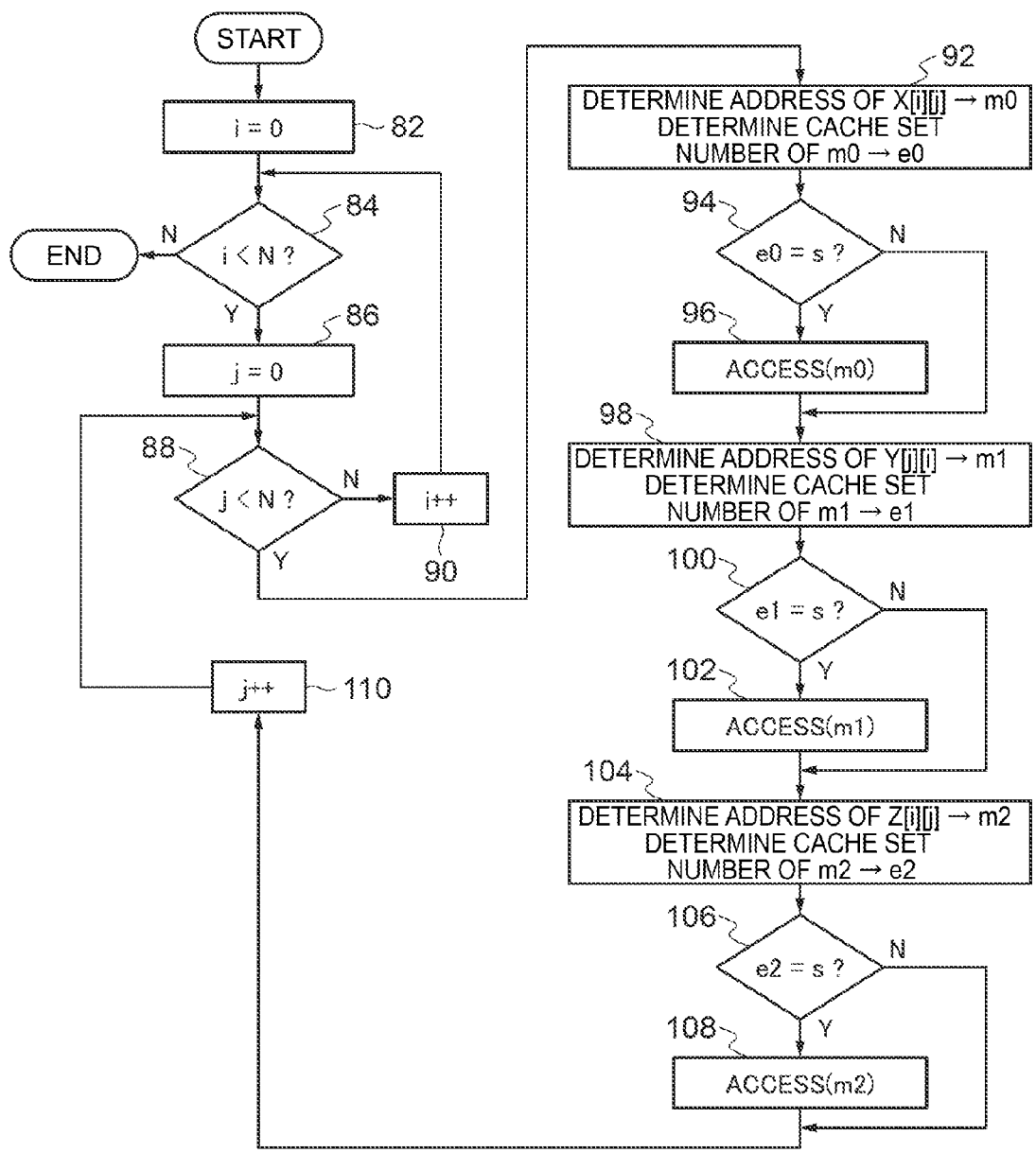
FIG. 5 is a flowchart illustrating an example of profile data acquisition processing in the first embodiment.
Figure 6:
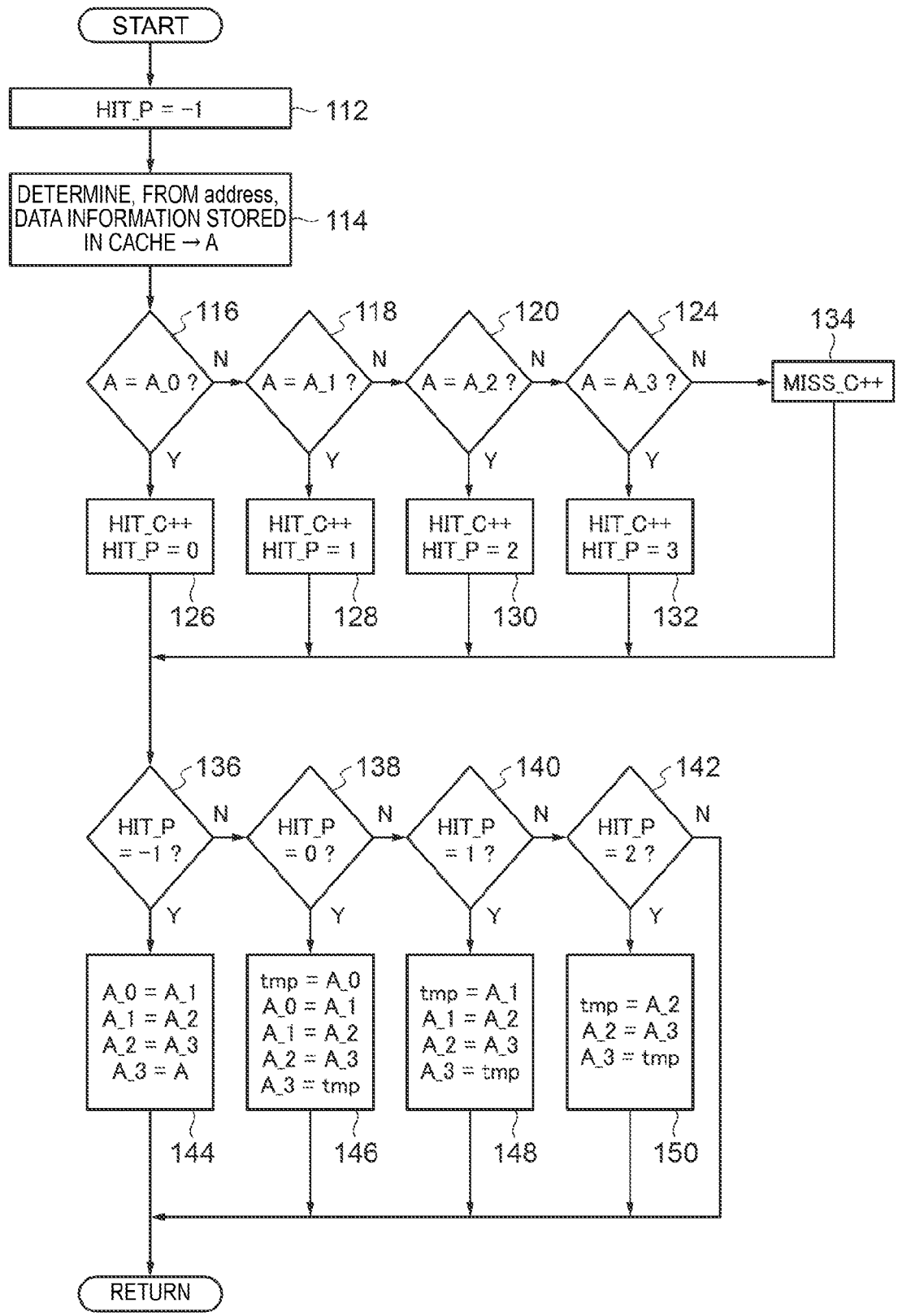
FIG. 6 is a flowchart illustrating an example of counting processing within the profile data acquisition processing of FIG. 5.

An example of the processing of the profile data acquisition program depicted in FIG. 2C is illustrated in FIG. 5 and FIG. 6. Note that, hereinafter, explanation is given with an example of this processing being profile data acquisition processing of the profile data acquisition program P1 of s=1. Accordingly, this processing is carried out by the computer 10s1. Steps 82 through 90 and step 110 in FIG. 5 correspond to codes C1, C2, C4 and C5 of FIG. 2C, and correspond to steps 42 through 50 and step 60 of FIG. 3. Note that steps 82 through 90 in FIG. 5 are carried out by the address computing section 91A.

Steps 92 through 96 correspond to program statements C3-1(X) through C3-3(X) of FIG. 2C. Namely, in step 92, the address computing section 91A determines the address (the byte address) of the array X that is identified by the variable i and the variable j, and substitutes the address in for m0. Here, given that the address of the main memory that is identified by the head X[0][0] of the array X[i][j] is 0x08000, and one data of the array X is 8 bytes, and the total number of the variables i is D2 (=N), the address that is substituted in for m0 is 0x08000+(D2*i+j)*8. Also in step 92, the set number computing section 92A determines the cache set number of the address m0, and substitutes the cache set number in for e0. Note that, given that the number of bytes per one cache set is B and the total number of cache sets is S, the cache set number e0 is obtained as the remainder when the quotient of m0/B is divided by S.

In step 94, the set number judging section 93A judges whether or not the cache set number e0 is the set number s that is handled by the profile data acquisition processing. As described above, for example, the computer 10s1 executes the profile data acquisition processing of the profile data acquisition program P1 of s=1. Accordingly, if the cache set number e0 is 1, the profile data of that array X must be acquired, and therefore, the profile data acquisition processing advances to step 96. If the results of the judgment of step 94 are negative, another computer acquires the profile data of that array X, and therefore, profile data is not acquired in the profile data acquisition processing that is executed by the computer 10s1. Accordingly, if the results of judgment of step 94 are negative, step 96 is skipped, and the profile data acquisition processing is moved on to step 98.

Steps 98 through 102 correspond to program statements C3-1(Y) through C3-3(Y) of FIG. 2C. Steps 98 through 102 are similar to steps 92 through 96, other than differing from access that is based on the array X, in so far as steps 98 through 102 are access that is based on the array Y, and therefore, explanation thereof is omitted. Note that, in program statement C3-1(Y), the total number of the variables j is D2 (=N).

Steps 104 through 108 correspond to program statements C3-1(Z) through C3-3(Z) of FIG. 2C. Steps 104 through 108 are similar to steps 92 through 96, other than differing from access that is based on the array X, in so far as steps 104 through 108 are access that is based on the array Z, and therefore, explanation thereof is omitted.

The processings of steps 94, 100, 106 are examples of contents of the judgment that is executed by the judging section in the disclosed technique.

Next, an example of counting processing (an example of processing of the ACCESS program), that counts the hits or misses and that is executed in steps 96, 102, 108 of FIG. 5 respectively, is described with reference to FIG. 6. In steps 96, 102, 108, the same ACCESS program is executed. Note that, when the cache set is different, a different ACCESS program is executed, but, if within the same cache set, the same ACCESS program is executed. Here, the same ACCESS program is executed in steps 96, 102, 108, but the reason why the notations ACCESS(m0), ACCESS(m1), ACCESS(m2) are used in steps 96, 102, 108 respectively is as follows. Namely, this is because the hit or miss of the data of address m0 is judged in step 96, and the hit or miss of the data of address m1 is judged in step 102, and the hit or miss of the data of address m2 is judged in step 108.

In step 112 of FIG. 6, the ACCESS program executing section 94A initializes, to −1, variable HIT_P that expresses at which block of the cache set s a hit has occurred and if there have been misses at all of the blocks.

In step 114, the ACCESS program executing section 94A determines the tag information that is stored in the tag storage region 404s of the cache memory from the address of the memory region of the main memory that is referred to on the basis of the array identified by the variables i, j, and substitutes the tag information in for A. The tag information that is substituted-in for A is tag information A.

In steps 116 through 124, the ACCESS program executing section 94A judges whether or not this tag information A is stored in any of the four blocks 170A0 through 170A3 of the cache set s. As described above, the associativity is 4 in the first embodiment. Note that the associativity is not limited to 4, and may be any of 5, 3, 6, 2 for example.

In step 116, the ACCESS program executing section 94A judges whether or not the tag information A is equivalent to tag information A__0 that is stored in the first block 170A0. If the tag information A is equivalent to the tag information A__0 that is stored in the first block 170A0, there is a hit. Thus, in step 126, the executing section increments HIT_C, that is the count number of the hits, by 1, and substitutes 0 in for the variable HIT_P. This 0 expresses that there is a hit at the first block 170A0.

If the results of the judgment in step 116 are negative, in step 118, the ACCESS program executing section 94A judges whether or not the tag information A is equivalent to tag information A__1 that is stored in the second block 170A1. If it is judged that the tag information A is equivalent to the tag information A__1 that is stored in the second block 170A1, there is a hit. Thus, in step 128, the ACCESS program executing section 94A increments the variable HIT_C by 1, and substitutes 1, that expresses that there is a hit at the second block 170A1, in for the variable HIT_P.

If the results of the judgment in step 118 are negative, in step 120, the ACCESS program executing section 94A judges whether or not the tag information A is equivalent to tag information A__2 that is stored in the third block 170A2. If the tag information A is equivalent to the tag information A__2 that is stored in the third block 170A2, there is a hit. Thus, in step 130, the ACCESS program executing section 94A increments the variable HIT_C by 1, and substitutes 2, that expresses that there is a hit at the third block 170A2, in for the variable HIT_P.

If the results of the judgment in step 120 are negative, in step 124, the ACCESS program executing section 94A judges whether or not the tag information A is equivalent to tag information A__3 that is stored in the fourth block 170A3. If the tag information A is equivalent to the tag information A__3 that is stored in the fourth block 170A3, there is a hit. Thus, in step 132, the ACCESS program executing section 94A increments the variable HIT_C by 1, and substitutes 3, that expresses that there is a hit at the fourth block 170A3, in for the variable HIT_P.

If the results of the judgment in step 124 are negative, there are misses at all of the blocks 170A_0 through 170A_3. Therefore, in step 134, the ACCESS program executing section 94A increments variable MISS_C, that counts the misses, by one.

The processings of steps 116 through 124 are examples of the contents of the judgment of the judging section of the disclosed technique. The processings of steps 126 through 132 are an example of the second processing of the disclosed technique. The processing of step 134 is an example of the first processing of the disclosed technique.

When any of steps 126 through 134 is executed, the profile data acquisition processing is moved on to step 136. In step 136, the ACCESS program executing section 94A judges whether or not the variable HIT_P is −1. If HIT_P is −1, this is a case in which the variable HIT_P is in its initial state as is, i.e., misses have occurred at all of the blocks. Thus, if the results of judgment in step 136 are affirmative, the profile data acquisition processing advances to step 144. If the results of judgment in step 136 are negative, the profile data acquisition processing is moved on to step 138. In step 138, the ACCESS program executing section 94A judges whether or not the variable HIT_P is 0, i.e., whether or not a hit has occurred at the first block 170A0. If it is judged that a hit has occurred at the first block 170A0, the profile data acquisition processing is moved on to step 146.

If the results of judgment of step 138 are negative, in step 140, the ACCESS program executing section 94A judges whether or not the variable HIT_P is 1, i.e., whether or not a hit has occurred at the second block 170A1. If it is judged that a hit has occurred at the second block 170A1, the profile data acquisition processing is moved on to step 148.

If the results of judgment of step 140 are negative, in step 142, the ACCESS program executing section 94A judges whether or not the variable HIT_P is 2, i.e., whether or not a hit has occurred at the third block 170A2. If a hit has occurred at the third block 170A2, the profile data acquisition processing is moved on to step 150.

In step 144 through step 150, rewriting of the tag information of the blocks in accordance with LRU (Least Recently Used) is carried out in accordance with the position of the block where a hit has occurred or in the case of misses.

Rewriting of the blocks in accordance with LRU is described here. As described above, the four blocks 170A0 through 170A3 are provided at the storage region 404s. Further, for example, it is prescribed that older address information is to be stored in the order of the first block 170A0, the second block 170A1, the third block 170A2, the fourth block 170A3 as depicted in FIG. 7A. Namely, it is prescribed that the newest address information is to be stored in the fourth block 170A3.

If the results of the judgment of step 136 are affirmative, there are misses at all of the blocks. Therefore, as depicted in FIG. 7A, the executing section first stores (overwrites) the tag information A__1 of the second block 170A1 in the first block 170A0. Namely, the oldest tag information A__0, that was stored in the first block 170A0, is rewritten with the tag information A__1. Next, the ACCESS program executing section 94A overwrites the tag information A__2 of the third block 170A2 into the second block 170A1. The executing section overwrites the tag information A__3 of the fourth block 170A3 into the third block 170A2. Then, the ACCESS program executing section 94A overwrites the tag information A, of the memory region of the main memory that is accessed this time, into the fourth block 170A3.

If the results of the judgment of step 138 are affirmative, a hit has occurred at the first block 170A0. Namely, as illustrated in FIG. 7B, the first block 170A0 has a hit. Thus, the ACCESS program executing section 94A causes tmp to temporarily hold the tag information A__0 of the first block 170A0. The ACCESS program executing section 94A carries out overwriting as follows. Namely, the tag information A__1 of the second block 170A1 is overwritten into the first block 170A0, the tag information A__2 of the third block 170A2 is overwritten into the second block 170A1, and the tag information A__3 of the fourth block 170A3 is overwritten into the third block 170A2. By the way, among the tag information A__0 through A__3, the oldest tag information is the tag information A__0. However, this time, because a hit has arisen at the first block 170A0, the tag information A__0 is equivalent to the newest tag information A. Thus, the tag information A that is held in tmp is overwritten into the fourth block 170A3.

If the results of the judgment in step 140 are affirmative, a hit has occurred at the second block 170A1. Namely, as illustrated in FIG. 7C, the ACCESS program executing section 94A causes tmp to hold the tag information A__1 that is recorded in the second block 170A1. Further, the ACCESS program executing section 94A carries out overwriting as follows. Namely, the tag information A__2 recorded in the third block 170A2 is overwritten into the second block 170A1. Further, the tag information A__3 recorded in the fourth block 170A3 is overwritten into the third block 170A2. The newest tag information A that is held in tmp is overwritten into the fourth block 170A3. Note that the tag information A__1 that was stored in the second block 170A1 is the newest tag information. On the other hand, the tag information A__0 that was stored in the first block 170A0 is the oldest tag information. Accordingly, there is no need to rewrite the tag information A__0 that was stored in the first block 170A0.

Accordingly, the tag information A_0 that was stored in the first block 170A0 remains stored in the first block 170A0.

If the results of the judgment in step 142 are affirmative, a hit has occurred at the third block 170A2. Namely, as illustrated in FIG. 7D, the ACCESS program executing section 94A causes tmp to hold the tag information A_2 that was recorded in the third block 170A2. Further, the ACCESS program executing section 94A carries out overwriting as follows. Namely, the tag information A_3 that was recorded in the fourth block 170A3 is overwritten into the third block 170A2, and the newest data that is held in tmp is overwritten into the fourth block 170A3. Note that the tag information A_2 that was stored in the third block 170A2 is the newest tag information. On the other hand, the tag information that were stored in the first block 170A0 and the second block 170A1 are the oldest tag information and the next oldest tag information respectively. Accordingly, there is no need to rewrite the tag information that were stored in the first block 170A0 and the second block 170A1. Accordingly, the tag information that were stored in the first block 170A0 and the second block 170A1 remain stored in the first block 170A0 and the second block 170A1.

Note that, if the results of judgment in step 142 are negative, a hit has occurred at the fourth block 170A3. The tag information that is stored in the fourth block 170A3 is the newest tag information. Because the tag information of the first block 170A0 through the fourth block 170A3 are lined-up in order from the oldest first, there is no need to rewrite the tag information of the first block 170A0 through the fourth block 170A3. Accordingly, if the results of judgment in step 142 are negative, rewriting of the tag information of the blocks is not carried out. The processings of steps 144 through 150 are examples of the contents of rewriting the storage blocks of the disclosed technique.

The respective values of the arrays X, Y, Z are identified by the variables i, j. the profile data acquisition processing ends due to the respective processings of steps 92 through 108 being executed for the variables i of 0 through N−1 (=D2) and the variables j of 0 through N−1 (=D2).

The computer $10_s0$ executes the profile data acquisition processing for the cache set s=0. The computer $10_s1$ executes the profile data acquisition processing for the cache set s=1. The computer $10_sN$ executes the profile data acquisition processing for the cache set s=N. Accordingly, each of the computers $10_s0$ through $10_sN$ acquires the profile data per cache set. Note that the respective computers $10_s0$ through $10_sN$ execute the profile data acquisition processings in parallel.

When the above-described profile data acquisition processing ends, the respective computers execute the following display processing (dumping). Namely, because each computer can acquire the profile data of the cache set corresponding to that device itself, the computer displays the total number of hits and the total number of misses on the display section 30. Then, for example, the profile data identified at the other computers $10_s1$ through $10_sN$ are sent to the computer $10_s0$. The computer $10_s0$ displays the total number of hits and the total number of misses per cache set, and displays the entire total number of hits and the entire total number of misses.

Effects of the first embodiment are described next.

First, the program converting program converts an original program, for which it is desired to acquire profile data, into a profile data acquisition program for acquiring profile data, for each of the cache sets of the cache memory. Accordingly, a profile data acquisition program for acquiring profile data can be created for each cache set of the cache memory.

Second, because the profile data acquisition program of each cache set of the cache memory is executed, profile data can be acquired for each cache set of the cache memory. Concretely, the total number of misses and the total number of hits can be acquired per cache set. Note that profile data can be acquired not only in cases of reading-out data from the main memory (steps 92 through 102 of FIG. 5), but also in cases of writing data to the main memory (steps 104 through 108 of FIG. 5).

Third, the computers, that correspond to the respective profile data acquisition programs, execute the profile data acquisition programs of the respective cache sets of the cache memory in parallel. Accordingly, the profile data per cache set can be acquired in a short time as compared with, for example, a case in which the profile data acquisition programs of the respective cache sets of the cache memory are executed in order at one computer. For example, if the number of cache sets is from 100 or more to several thousand or more, the profile data of each cache set can be acquired at a speed that is 100 times to several thousand times or more faster.

Fourth, it is merely judged whether or not the tag information, that is based on the address information of the memory region of the main memory, is equivalent to the tag information of each block of the cache set. Therefore, even if the original program is a program that carries out computation, there is no need for floating point arithmetic.

Fifth, the profile data acquisition processing is processing merely for acquiring profile data without carrying out concrete computation. Therefore, the profile data per cache set can be acquired rapidly.

Sixth, accessing of the main memory and the cache memory is not carried out in actuality, and accessing of the main memory and the cache memory is simulated. Accordingly, the profile data of each cache set can be acquired without using a computing system (an actual device) that uses a main memory and a cache memory. Due thereto, the following effect also is achieved. Namely, when using an actual device, only profile data that is limited to the structure (the number of cache sets and the number of blocks) of the cache memory of that actual device is obtained. However, if the number of computers and the number of blocks of the tag storage regions within the memories of the computers are changed in accordance with the structures of various types of cache memories, profile data per cache set of structures of various types of cache memories can be acquired.

Modified examples of the first embodiment are described next. First, the disclosed technique is not limited to using computers of a number that is equal to the number of cache sets of the cache memory, and the following structure is possible for example. Profile data acquisition processing of each cache set of the cache memory may be executed at one computer. Further, for example, two computers may be used, and profile data acquisition processing of the cache sets of the odd-numbered set numbers may be executed at one computer, and profile data acquisition processing of the cache sets of the even-numbered set numbers may be executed at the other computer. The reason why such a modified example is possible is as follows. Namely, the respective profile data acquisition programs that correspond to the respective cache sets are identified by the cache set number s. Accordingly, when it is desired to acquire the profile data of a given cache set, it is possible to select only the profile data acquisition program that is identified by that cache set number s. By executing the selected profile data acquisition program, the profile data of that cache set can be acquired.

Second, profile data of each cache set of cache memories of various types of structures may be acquired. Namely, the number of cache sets may be changed or the number of blocks of each set may be changed, and, in accordance therewith, the number of computers may be changed or the number of blocks of the tag storage regions within the memories of the computers may be changed.

Third, the disclosed technique is not limited to counting both the total number of hits and the total number of misses, and, for example, either one of the total number of hits or the total number of misses may be counted. Further, the number of times of an affirmative judgment when the results of judgment of step 94 of FIG. 5 are affirmative are counted. Moreover, for example, when only the total number of hits are counted, the total number of hits is subtracted from the number of times of an affirmative judgment, and the total number of misses is computed. Further, when counting only the total number of misses, the total number of misses is subtracted from the number of times of an affirmative judgment, and the total number of hits is computed.

Fourth, instead of tag information, the address itself may be used. Further, for each of a case of reading-out data from the main memory and a case of writing data to the main memory, the hit variable and the miss variable corresponding to each case may be updated. The variable is incremented by 1, but 1 may be subtracted from a predetermined value in accordance with a hit or a miss. All of the above-described modified examples are applicable as well to all of the other embodiments that are described hereinafter.

Second Embodiment

A second embodiment is described next.

Because the structure of the second embodiment is similar to the structure of the first embodiment, description thereof is omitted. Note that the second embodiment differs from the structure of the first embodiment with regard to the point that, in the second embodiment, a file, that stores the results of condition judgment that are described hereinafter, is stored in the database 12.

Operation of the second embodiment is described next. Because the operation of the second embodiment is substantially similar to the operation of the first embodiment, only the portions that differ are described.

Figure 9:
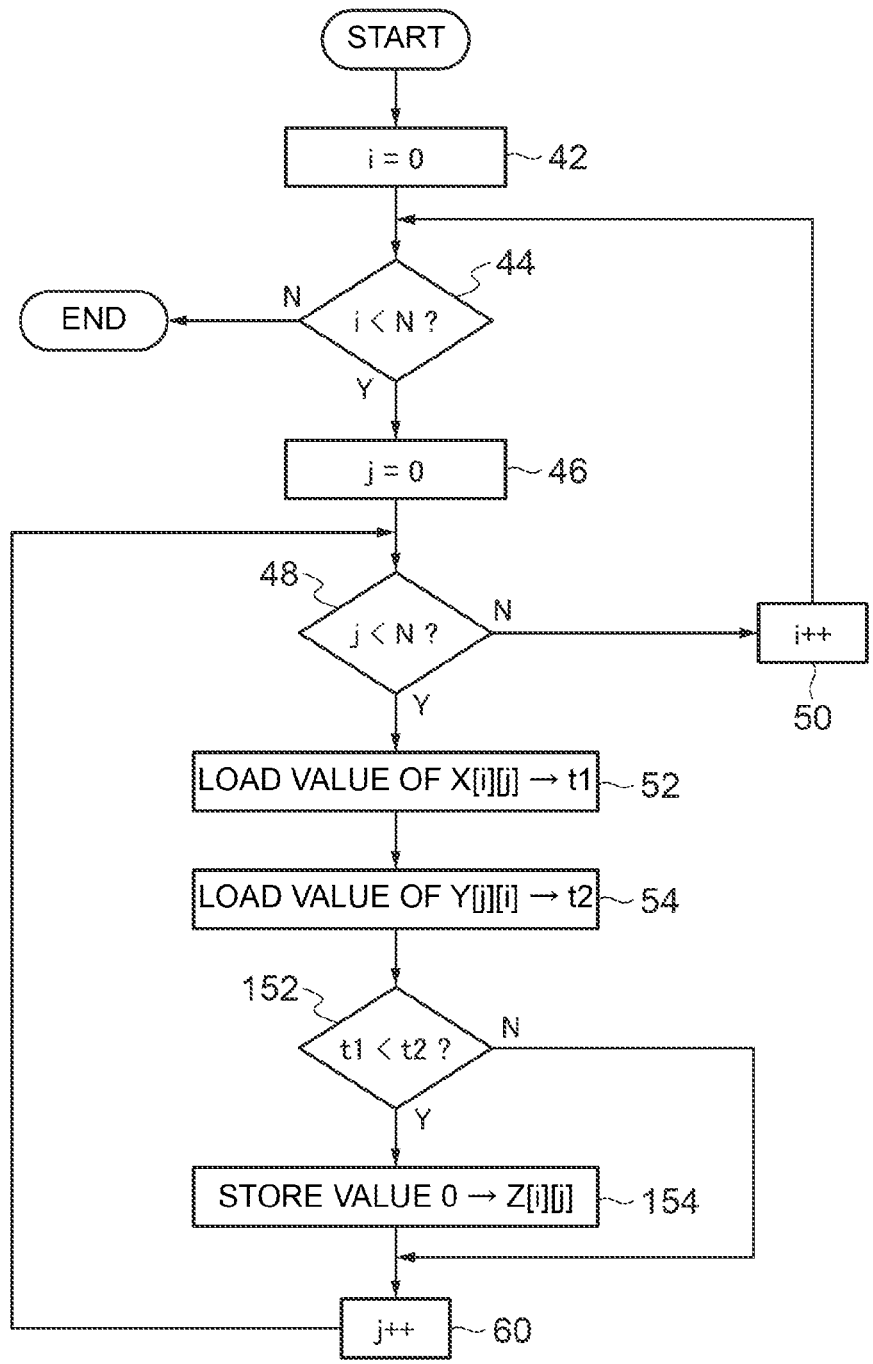
FIG. 9 is a flowchart illustrating an example of addition processing in accordance with the original program in the second embodiment.

In the second embodiment, a program, whose executed contents vary in accordance with values of data, is original program P002 for which it is desired to acquire profile data (see FIG. 8A). An example of the processing in accordance with this original program P002 is illustrated by a flowchart in FIG. 9. As can be understood by comparing FIG. 8 and FIG. 3, the example of the processing of the original program P002 of the second embodiment is substantially similar to the example of the processing of the original program P001 of the first embodiment, and therefore, the portions that differ are described. Namely, in the example of the processing of the original program P002 of the second embodiment, after the executing section executes steps 42 through 54, in step 152, the executing section judges whether or not t1 is less than t2. If the results of judgment of step 152 are affirmative, in step 154, the executing section records the value 0, that is the results of condition judgment, in the address of the main memory that corresponds to the array Z that is identified by the variable i and the variable j. In this way, the contents that are executed vary such that the value 0 is stored or is not stored in the main memory in accordance with the results of the judgment of step 152.

When this original program P002 is converted by the same program converting program as the program converting program of the first embodiment (FIG. 4), the profile data acquisition program Pi that is illustrated in FIG. 8C is generated. An example of the program converting processing is described hereinafter. The source codes C1, C2, C4 and C5 of the original program P002 (FIG. 8A) are similar to the source codes C1, C2, C4 and C5 of the original program P001 of FIG. 2A, respectively. Accordingly, the processings by which the source codes C1, C2, C4 and C5 of the original program P002 (FIG. 8A) are converted are similar to the first embodiment, and therefore, description thereof is omitted. Note that, because source code C8 of the original program P002 (FIG. 8A) is classified as Y1, this code C8 is used in the profile data acquisition program Pi.

Next, the converting processing of source code C6 of the original program P002 (FIG. 8A) is described. The source code C6 is classified as Y3. Accordingly, first, the source code C6 is converted as follows by the processings of steps 70 through 71 (see FIG. 8B as well). Reference array R in the source code C6 is based on the array X and the array Y. For the array X, program statements C6-1(X) and C6-2(X) of FIG. 8C are created by the processing of step 70, and program statement C6-3(X) is created by the processing of step 71. Similarly, for the array Y, program statements C6-1(Y) and C6-2(Y) are created by the processing of step 70, and program statement C6-3(Y) is created by the processing of step 71. Next, program statement C6-41 is created by the processing of creating the program statement of "read-in condition judgment results from file" of step 73 (see FIG. 8B as well) being executed. Program statement C6-42 is created by the processing of creating the program statement of "judge condition" of step 74 being executed.

Note that source code C7 (FIG. 8A) is classified as Y2, and program statements C7-1(Z) through C7-3(Z) are created by the processings of steps 66 through 68.

Figure 10:
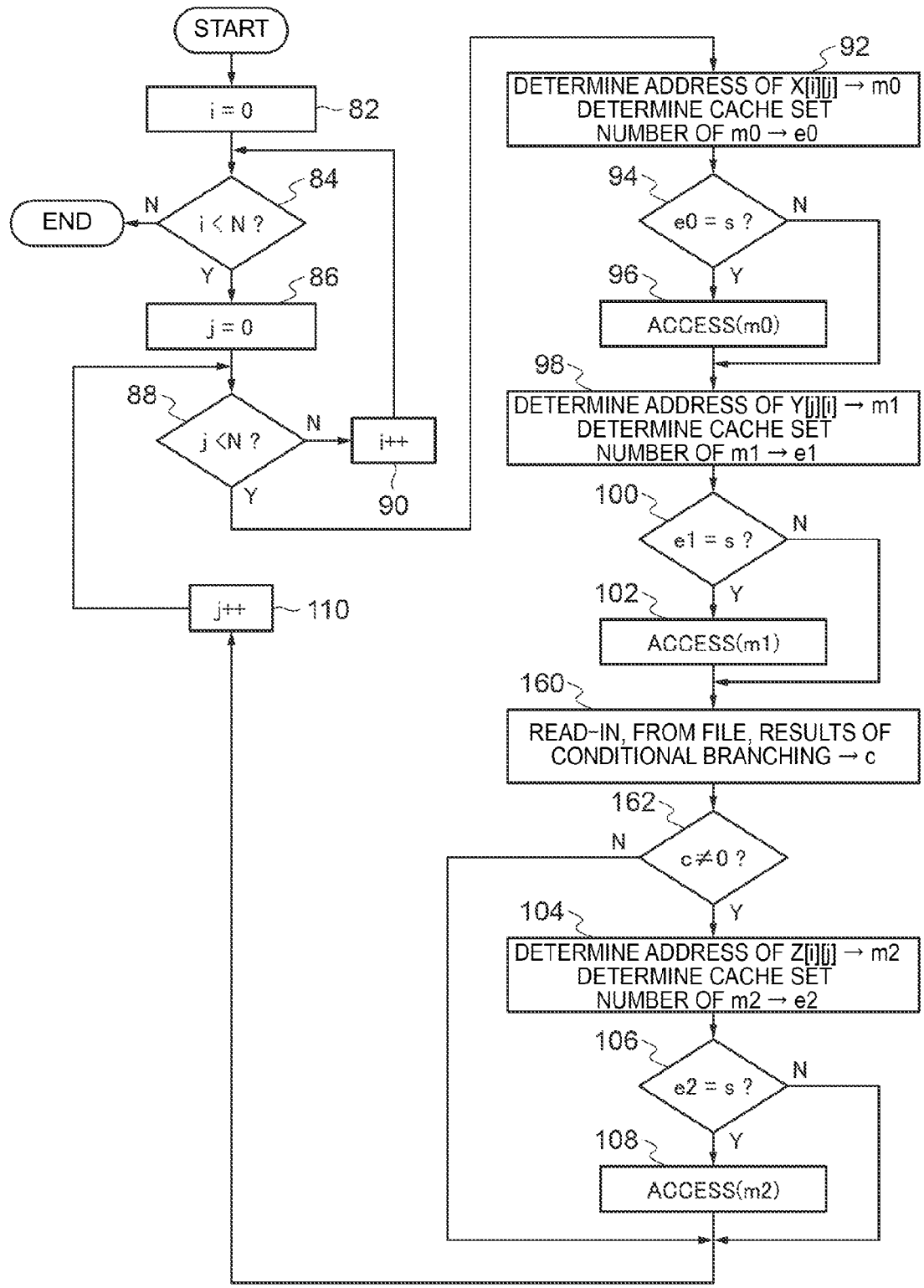
FIG. 10 is a flowchart illustrating an example of profile data acquisition processing in the second embodiment.

An example of the profile data acquisition processing of the profile data acquisition program Pi (FIG. 8C), that is obtained by the original program P002 (FIG. 8A) being converted as described above, is illustrated in FIG. 10. Because the example of this processing is substantially similar to FIG. 5, only the portions that differ are described. Namely, after the ACCESS program executing section 94A executes steps 82 through 102, in step 160, the ACCESS program executing section 94A reads-in the results of conditional branching from the file, and substitutes the results in for c. In step 162, the ACCESS program executing section 94A judges whether or not c is not 0, i.e., whether or not the value (t1) of X is less than the value (t2) of Y. If c is not 0, i.e., if the value (t1) of X is less than the value (t2) of Y, the profile data acquisition processing advances to step 104. On the other hand, if c is 0, i.e., if the value (t1) of X is not less than the value (t2) of Y, the profile data acquisition processing skips steps 104 through 108, and advances to step 110.

As the effects of the second embodiment, effects that are similar to those of the first embodiment are obtained even if the original program is a program whose executed contents vary in accordance with values of data.

Third Embodiment

A third embodiment is described next.

Because the structure of the third embodiment is substantially similar to the structure of the first embodiment, only the portions that differ are described.

Figure 11:
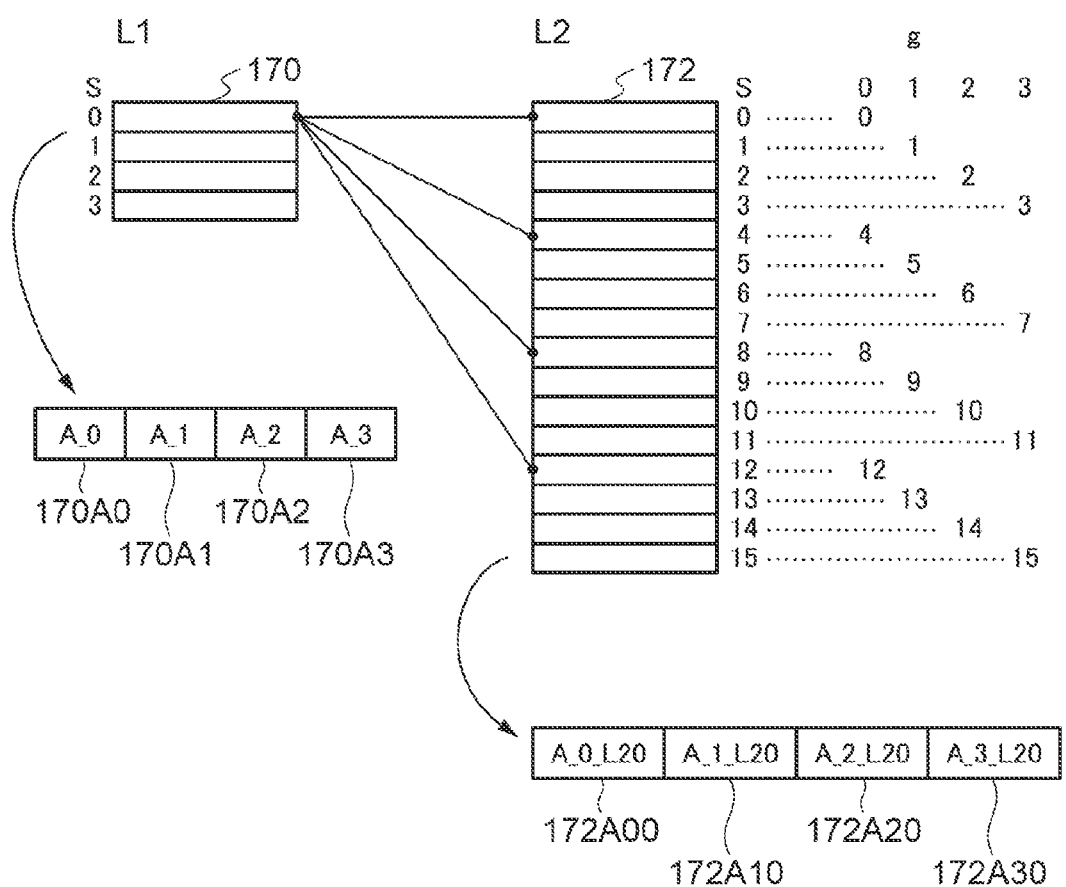
FIG. 11 is a drawing depicting an example of cache memories of two levels.

The third embodiment differs from the first embodiment and the second embodiment with regard to the point that the third embodiment supposes the use of caches of plural levels, e.g., two levels. Namely, as depicted in FIG. 11, in the third embodiment, it is supposed that cache memories 170 (L1), 172 (L2) of two levels are provided. There are four sets at the first cache memory 170, whereas there are 16 sets at the second cache memory 172. Accordingly, in the third embodiment, there are also plural levels, i.e., two levels, of tag storage regions. Accordingly, in the memory 34 of the computer that corresponds to a given cache set, one storage region is provided in accordance with the cache set of the first level, and four storage regions are provided in accordance with the cache set of the second level.

The set numbers of the first-level cache memory 170 and the set numbers of the second-level cache memory 172 have the following relationship. Each cache set of the second-level cache memory 172 corresponds to the set of the first-level cache memory 170 of the set number that corresponds to the remainder that is obtained when dividing the set number of that cache set of the second-level cache memory 172 by 4 (the number of sets of the first-level cache memory 170). For example, set number 0 of the second-level cache memory 172 corresponds to the cache set of the set number 0 of the first-level cache memory 170 because the remainder when 0 is divided by 4 is 0. Thereafter, similarly, set numbers 1, 2, 3 of the second-level cache memory 172 correspond to set numbers 1, 2, 3 of the first-level cache memory 170. Similarly, set numbers 4 through 7, 8 through 11, and 12 through 15 of the second-level cache memory 172 correspond to set numbers 0 through 3 of the first-level cache memory 170, respectively. Accordingly, the cache sets of the second-level cache memory 172 are divided into four groups that respectively correspond to set numbers 0, 1, 2, 3 of the cache sets of the first-level cache memory 170, i.e., are divided into group g=0 through group g=3.

Note that the associativity of each of the first-level cache memory 170 and the second-level cache memory 172 is 4. As depicted in FIG. 11, the tag storage region that corresponds to a cache set of the first-level cache memory 170 has the four blocks 170A0 through 170A3. Further, each of the four tag storage regions that correspond to a cache set of the second-level cache memory 172 has four blocks 172A00 through 172A30.

The processing of the four blocks 172A00 through 172A30 is an example of the corresponding storage portions of the disclosed technique.

Operation of the third embodiment is described next. Because the operation of the third embodiment is substantially similar to the operation of the first embodiment, only the portions that differ are described.

Figure 12:
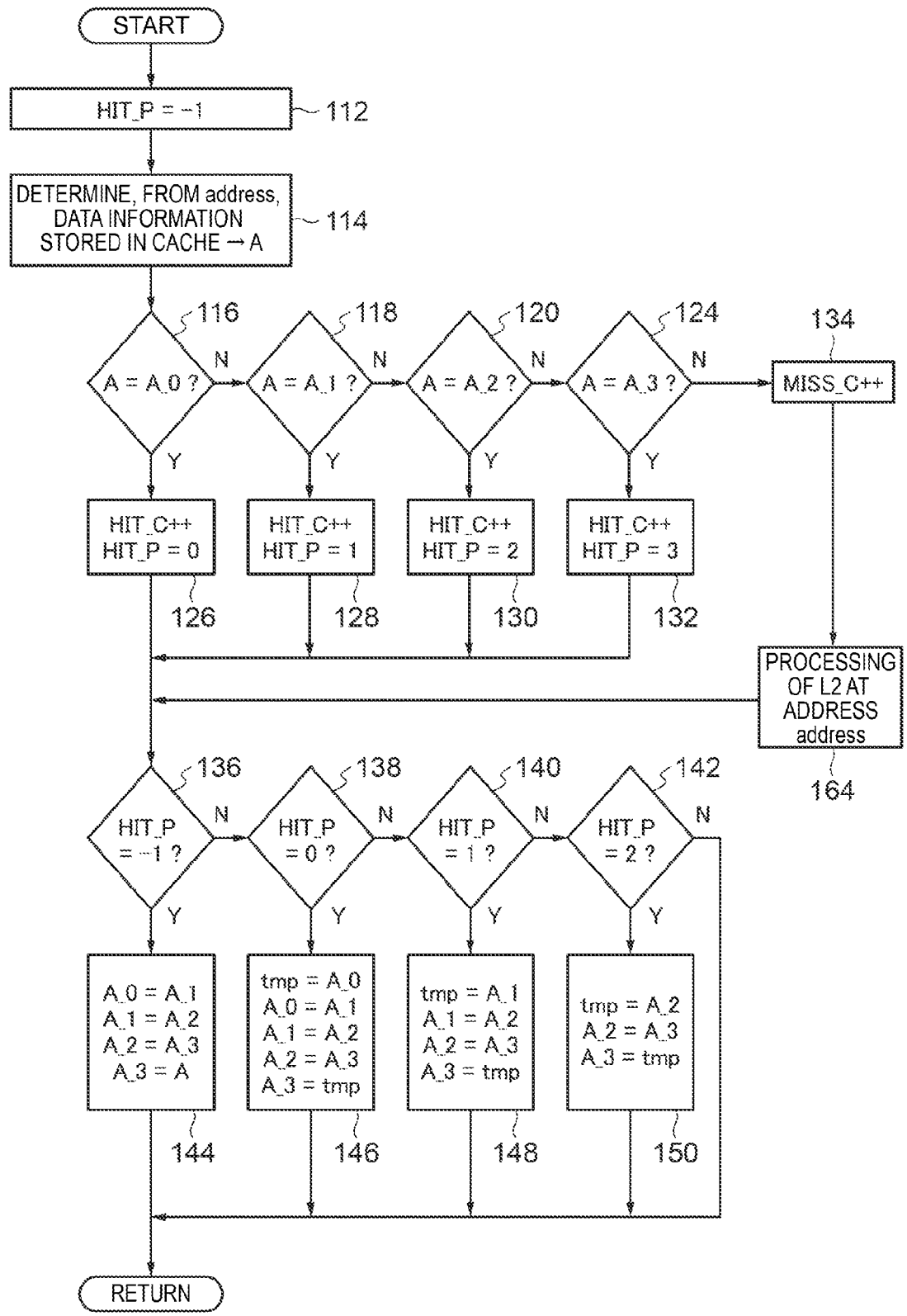
FIG. 12 is a flowchart illustrating an example of profile data acquisition processing in a third embodiment.

The original program for which it is desired to acquire profile data in the third embodiment is the same as the original program of the first embodiment (see FIG. 2A), and therefore, description thereof is omitted. The profile data acquisition program of the third embodiment as well is substantially similar to the profile data acquisition program of the first embodiment (see FIG. 5 and FIG. 6), and therefore, only the portions that differ are described. In an example of the profile data acquisition processing of the third embodiment, as illustrated in FIG. 12, the following processings are executed after step 134 of the profile data acquisition processing (FIG. 6). Namely, in step 164, the ACCESS program executing section 94A executes counting processing that counts the hits or misses for the second-level cache memory 172 (L2), by using the address (address) of the main memory.

Figure 13:
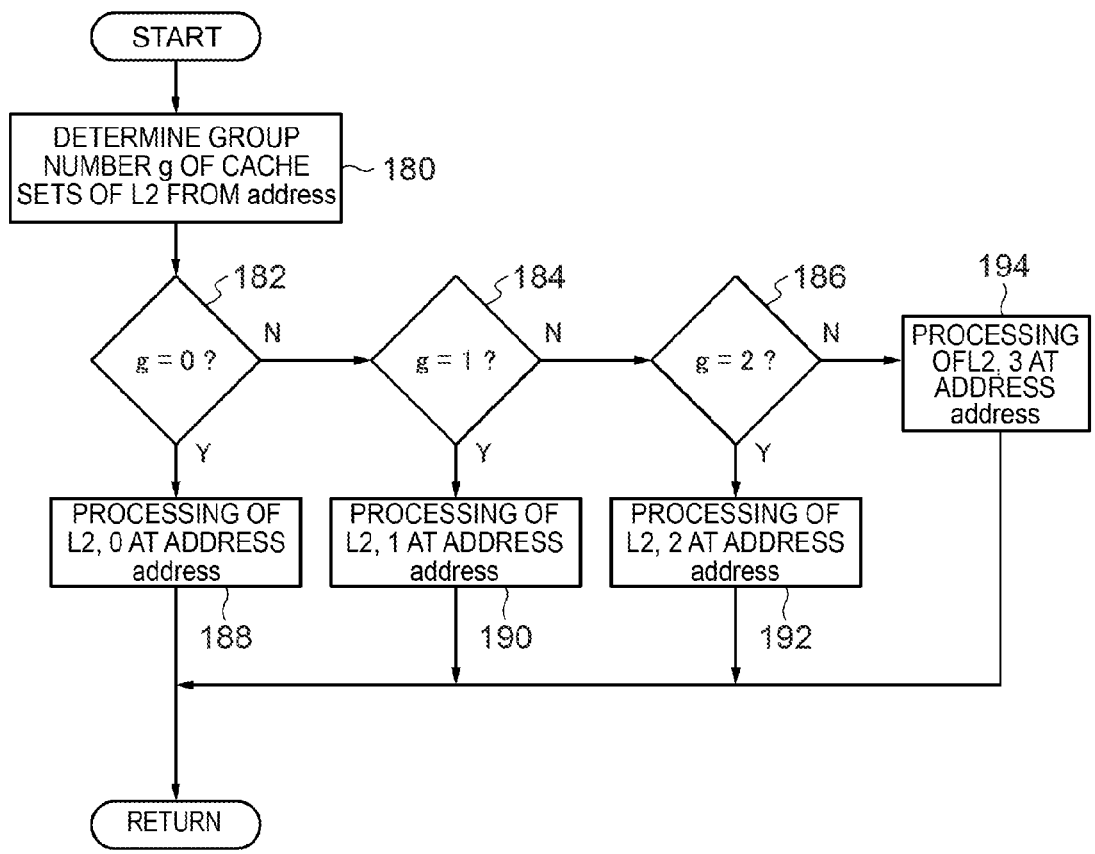
FIG. 13 is a flowchart illustrating an example of counting processing of the second-level cache memory in the profile data acquisition processing of FIG. 12.

An example of the processing of step 164 is illustrated concretely in FIG. 13. In step 180 of FIG. 13, the ACCESS program executing section 94A determines, from the address, a group number g of a cache set of the second-level cache memory 172. Namely, the set numbers of the first-level cache memory 170 are determined in accordance with the addresses of the main memory. Further, as described above, the set numbers of the second-level cache memory 172 correspond to the respective set numbers of the first-level cache memory 170. Thus, in present step 180, the ACCESS program executing section 94A determines the group number g of a cache set of the second-level cache memory 172 as follows. Namely, the aforementioned group number g is determined from the relationship of correspondence between the addresses of the main memory, the cache sets of the first-level cache memory 170, and the cache sets of the second-level cache memory 172.

In step 182, the ACCESS program executing section 94A judges whether or not the aforementioned group number g is group g=0 at which that device itself handles the counting processing of the hits or misses. If the results of judgment in step 182 are affirmative, in step 188, the ACCESS program executing section 94A carries out counting processing of the hits or misses at the cache sets of the group g=0 at the address of the main memory. On the other hand, if the results of the judgment of step 182 are negative, in step 184, the ACCESS program executing section 94A judges whether or not the aforementioned group number g is group g=1 at which that device itself handles counting processing of the hits or misses. If the results of judgment in step 184 are affirmative, in step 190, the ACCESS program executing section 94A carries out counting processing of the hits or misses of the group g=1 at the aforementioned address.

If the results of judgment of step 184 are negative, in step 186, the ACCESS program executing section 94A judges whether or not the aforementioned group number g is group g=2 at which that device itself handles the counting processing of the hits or misses. If the results of judgment in step 186 are affirmative, in step 192, the ACCESS program executing section 94A carries out counting processing of hits or misses of the group g=2 at the aforementioned address.

If the results of judgment of step 186 are negative, the aforementioned group number g is group g=3 at which that device itself handles the counting processing of hits or misses. Accordingly, in this case, in step 194, the ACCESS program executing section 94A carries out counting processing of hits or misses of the group g=3 at the aforementioned address.

Here, for example, the computer 10s0 handles the counting processing of hits or misses at the cache sets of the group g=0 at an address of the main memory. Accordingly, at the computer 10s0, the results of judgment of step 182 are affirmative, and the processing of step 188 is carried out.

Figure 14B:
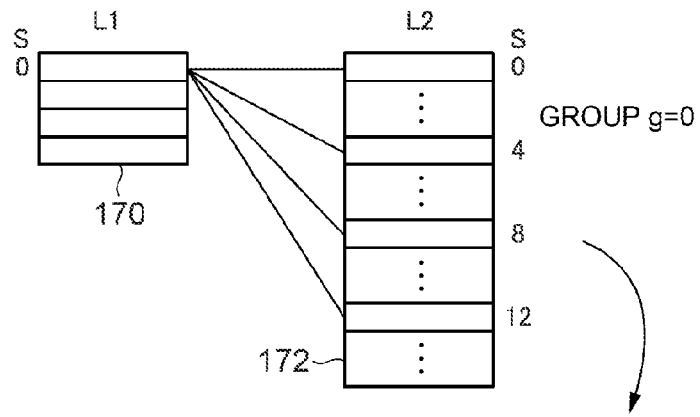
FIG. 14B is a drawing depicting the relationship between a cache set of a first-level cache memory 170 and cache sets of a second-level cache memory 172 of the group g=0.

As illustrated in FIG. 14B, the cache sets 0, 4, 8, 12 of the group g=0 of the second-level cache memory 172 correspond to the cache set whose set number is 0 of the first-level cache memory 170. As the processing of step 188, the following counting processing is executed for each of these cache sets 0, 4, 8, 12. Hereinafter, the counting processing is described by using the cache set 0 as an example. Note that tag information A_0_L20 through A_3_L20 are stored in the first block 172A00 through the fourth block 172A30 of cache set 0.

Figure 14A:
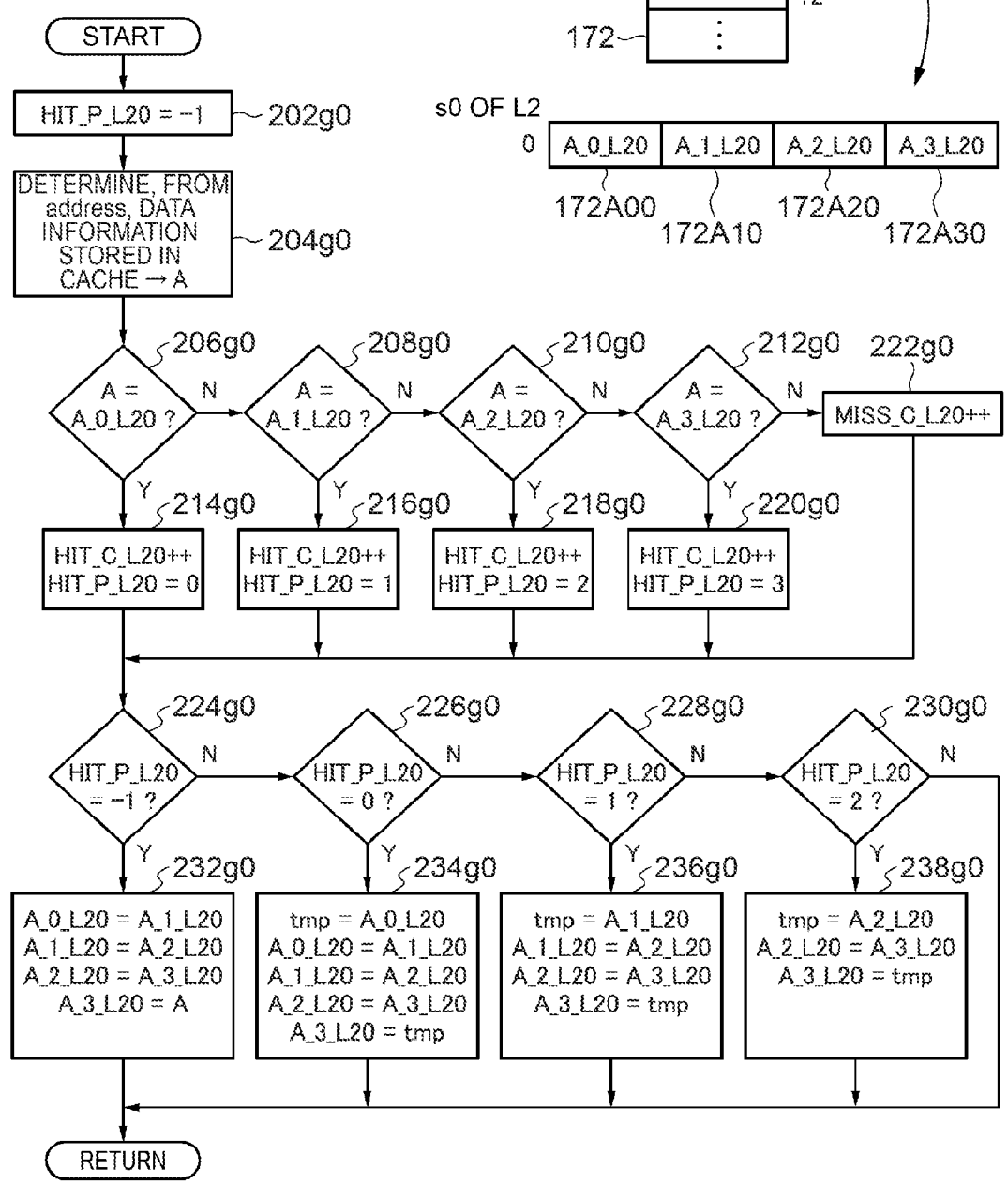
FIG. 14A is a flowchart illustrating an example of counting processing at a cache set of group g=0 in the cache memory.

When the processing of step 188 starts, at step 202g0 in FIG. 14A, variable HIT_P_L20 is initialized to −1. Note that the variable HIT_P_L20 is a variable expressing which block of the cache set s of the second-level cache memory 172 has a hit and if there are misses at all of the blocks.

In step 204g0, the ACCESS program executing section 94A determines, from the aforementioned address, the data information (tag information) that is stored in the tag storage region of the cache memory 172, and substitutes the data information (tag information) in for A.

In step 206g0, the ACCESS program executing section 94A judges whether or not tag information A is equivalent to tag information A__0_L20 that is recorded in the first block 172A00 at the second-level cache memory 172. If the tag information A is equivalent to this tag information A__0_L20, there is a hit at the first block 172A00. Thus, in step 214g0, the ACCESS program executing section 94A increments, by 1, variable HIT_C_L20 that expresses the number of times a hit has occurred at the second-level cache memory 172. Further, the ACCESS program executing section 94A substitutes "0", that expresses that there has been a hit at the first block 172A00, in for the variable HIT_P_L20.

If the results of judgment in step 206g0 are negative, in step 208g0, the ACCESS program executing section 94A judges whether or not the tag information A is equivalent to tag information A__1_L20 that is stored in the second block 172A10. If the results of judgment in step 208g0 are affirmative, there is a hit at the second block 172A10. Thus, in step 216g0, the ACCESS program executing section 94A increments the variable HIT_C_L20 by 1, and substitutes "1", that expresses that there has been a hit at the second block 172A10, in for the variable HIT_P_L20.

If the results of judgment in step 208g0 are negative, in step 210g0, the ACCESS program executing section 94A judges whether or not the tag information A is equivalent to tag information A__2_L20 that is stored in the third block 172A20. If the results of judgment in step 210g0 are affirmative, there is a hit at the third block 172A20. Thus, in step 218g0, the ACCESS program executing section 94A increments the variable HIT_C_L20 by 1, and substitutes "2", that expresses that there has been a hit at the third block 172A20, in for the variable HIT_P_L20.

If the results of judgment in step 210g0 are negative, in step 212g0, the ACCESS program executing section 94A judges whether or not the tag information A is equivalent to tag information A__3_L20 that is stored in the fourth block 172A30. If the results of judgment in step 212g0 are affirmative, there is a hit at the fourth block 172A30. Thus, in step 220g0, the ACCESS program executing section 94A increments the variable HIT_C_L20 by 1, and substitutes "3", that expresses that there has been a hit at the fourth block 172A30, in for the variable HIT_P_L20.

If the results of judgment of step 212g0 are negative, there is a case in which there has not been a hit at any of the blocks 172A00 through 172A30. Accordingly, in step 222g0, the ACCESS program executing section 94A increments, by 1, variable MISS_C_L20 for counting the misses at the second-level cache memory.

The processings of steps 206g0 through 212g0 are examples of the judgments of the storage judging section of the disclosed technique. The processings of steps 214g0 through 222g0 are an example of the third processing of the disclosed technique. The processing of step 222g0 is an example of the fourth processing of the disclosed technique.

Note that the processings of steps 224g0 through 238g0 are the rewriting of tag information based on LRU of the tag information of the first block through the fourth block of the second-level cache memory. The processings of steps 224g0 through 238g0 differ from steps 136 through 150 of FIG. 6 of the first embodiment with regard to the point that the second-level cache memory is the object, but, because the concrete processings thereof are similar, description thereof is omitted.

The processing illustrated in FIG. 14A is carried out also for the respective blocks of each of the other three cache sets 4, 8, 12 of the group g=0.

Figure 15B:
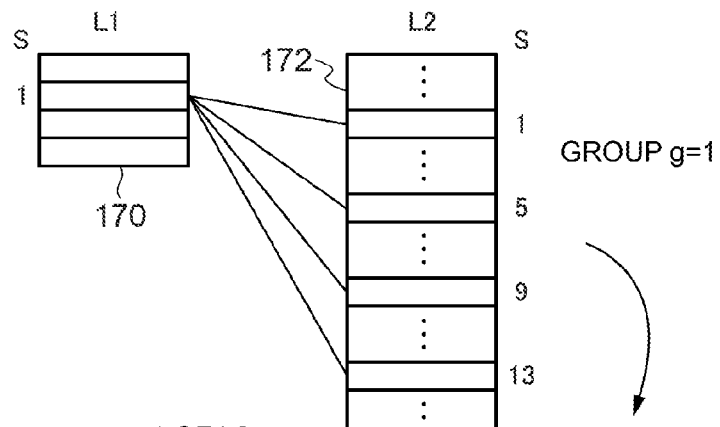
FIG. 15B is a drawing depicting the relationship between a cache set of the first-level cache memory 170 and cache sets of the second-level cache memory 172 of the group g=1.
Figure 15A:
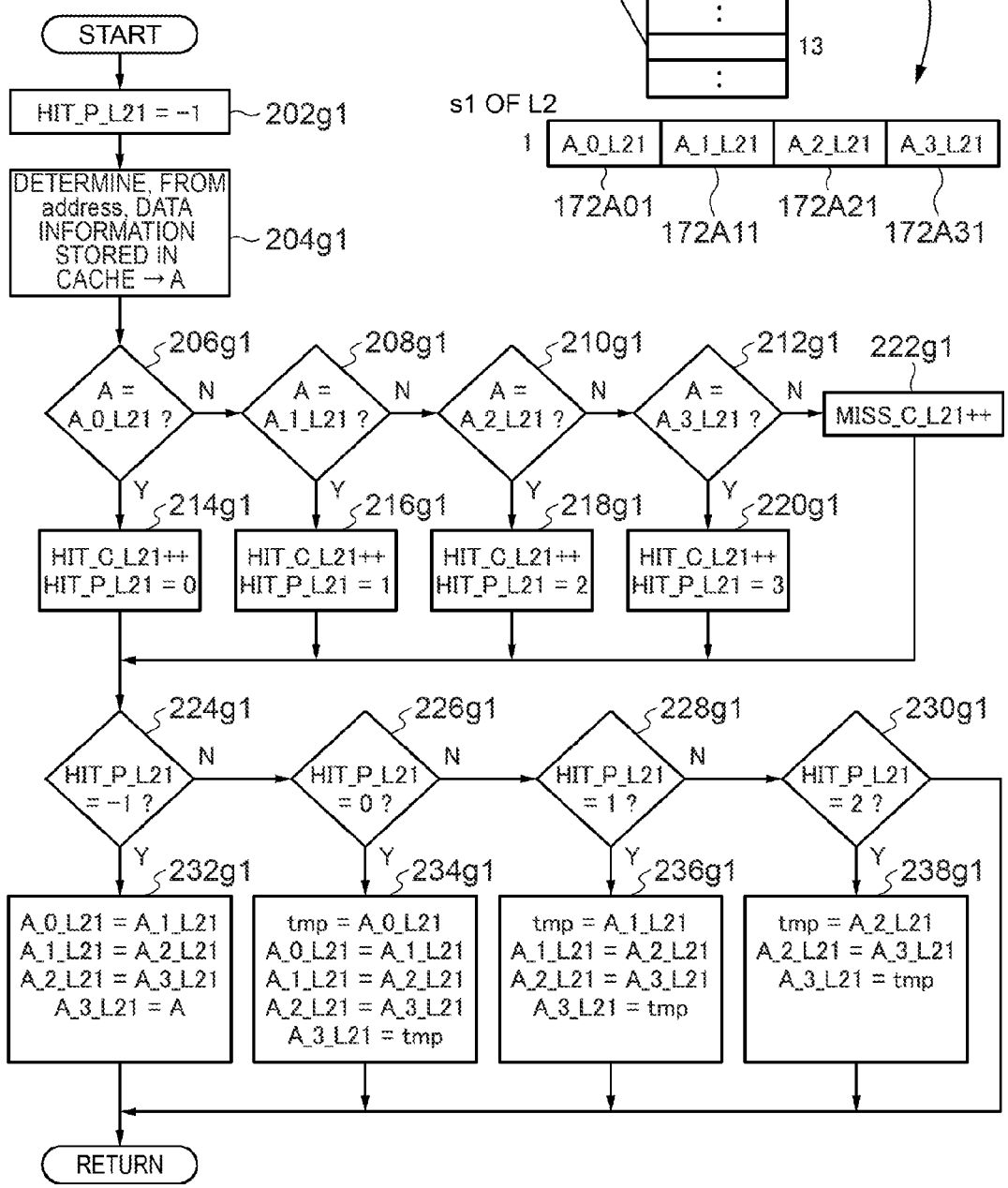
FIG. 15A is a flowchart illustrating an example of counting processing at a cache set of group g=1 in the cache memory.
Figure 16B:
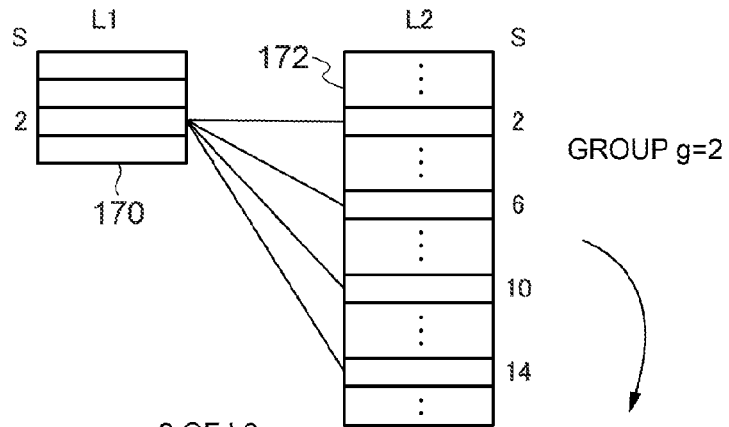
FIG. 16B is a drawing depicting the relationship between a cache set of the first-level cache memory 170 and cache sets of the second-level cache memory 172 of the group g=2.
Figure 16A:
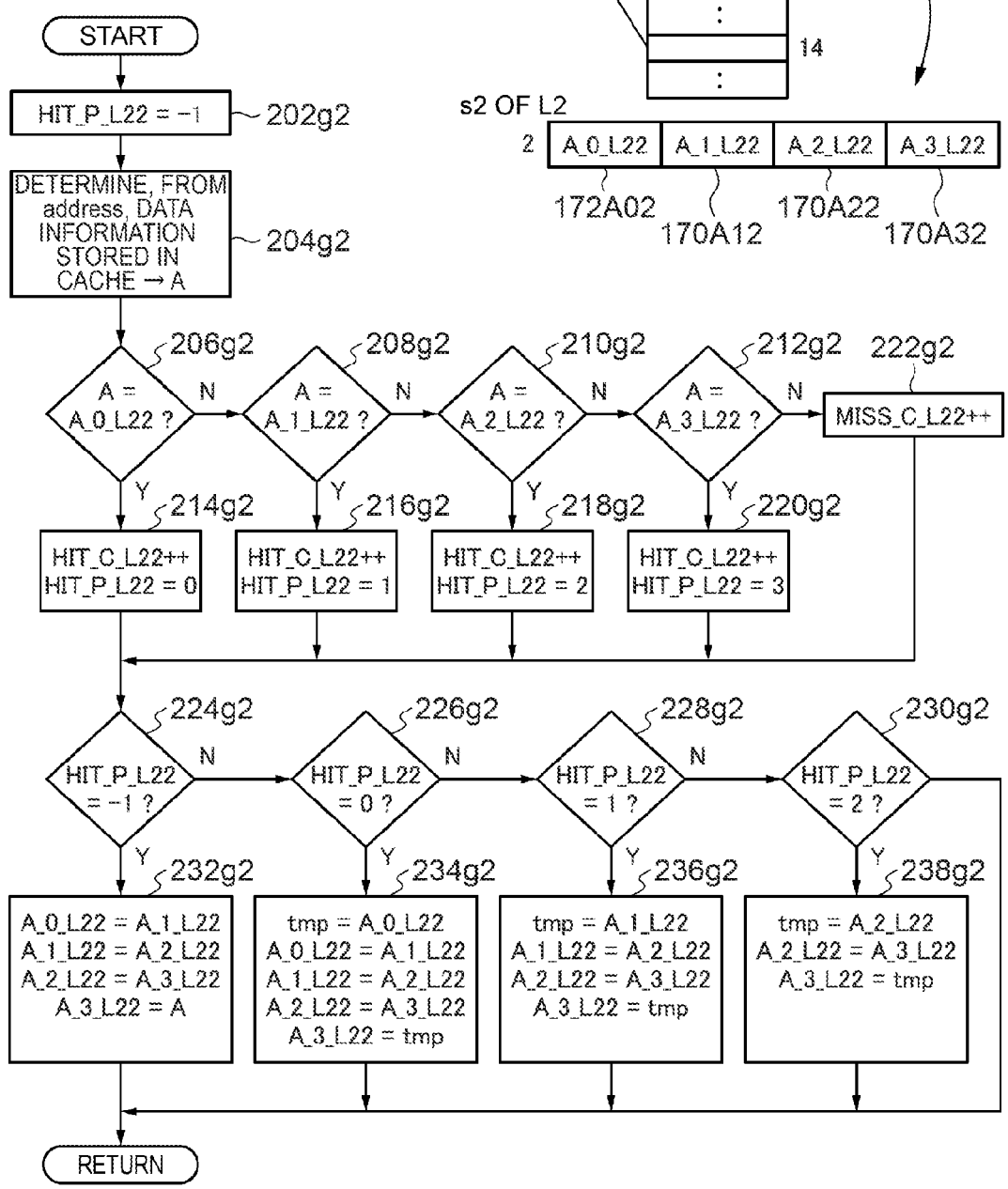
FIG. 16A is a flowchart illustrating an example of counting processing at a cache set of group g=2 in the cache memory.
Figure 17B:
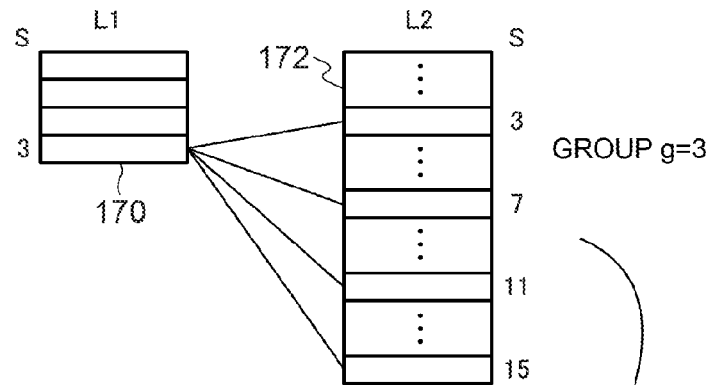
FIG. 17B is a drawing depicting the relationship between a cache set of the first-level cache memory 170 and cache sets of the second-level cache memory 172 of the group g=3.
Figure 17A:
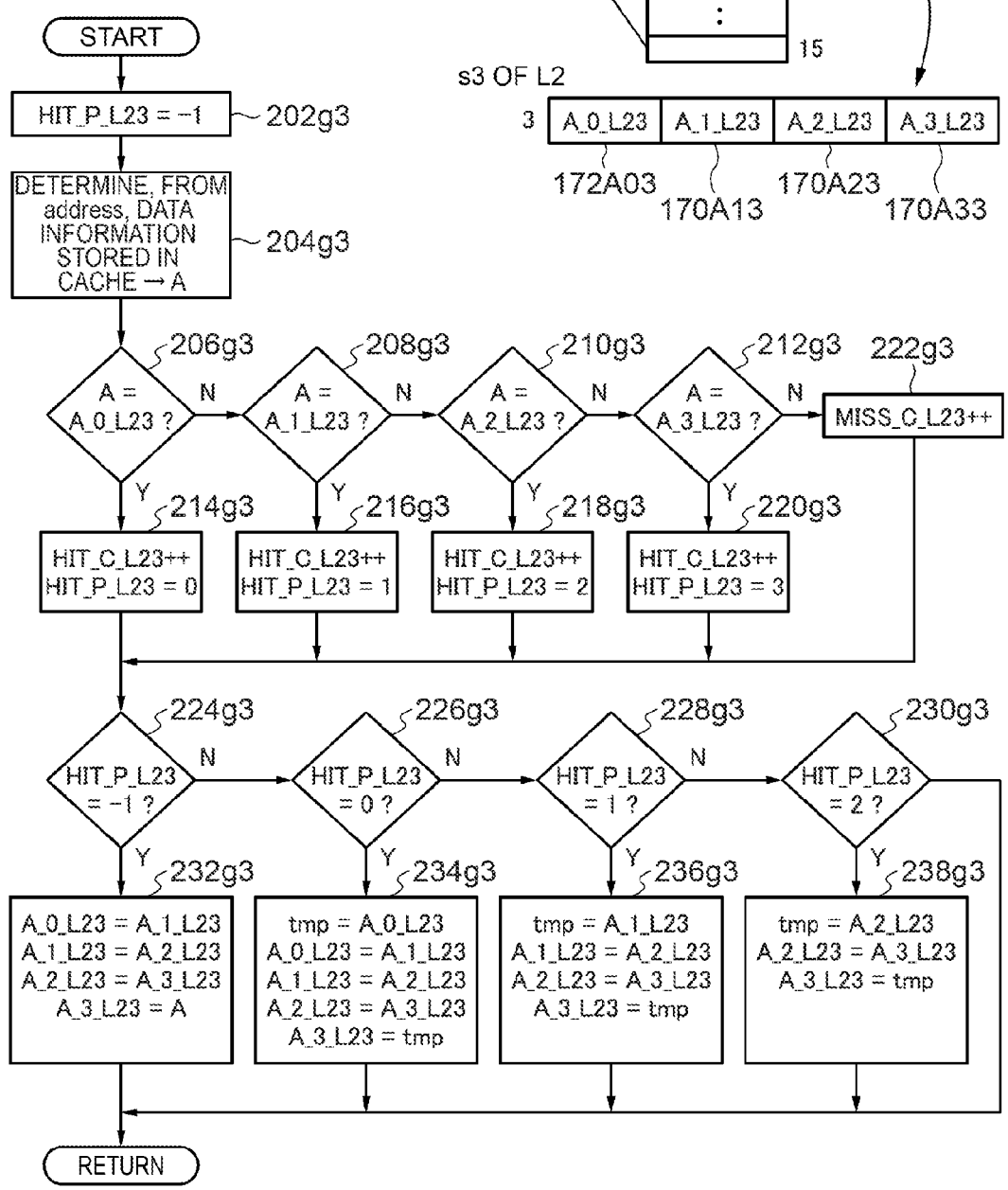
FIG. 17A is a flowchart illustrating an example of counting processing at a cache set of group g=3 in the cache memory.

The program illustrated in FIG. 14A is for the group g=0. In the present embodiment, there are the groups g=1 through g=3 as the other groups. For the group g=1, the counting processing illustrated in FIG. 15A is executed at another computer. For the group g=2, the counting processing illustrated in FIG. 16A is executed at yet another computer. For the group g=3, the counting processing illustrated in FIG. 17A is executed at still another computer.

When the processings of step 164, i.e., the processing of FIG. 13 and any of the processings corresponding to the groups of FIG. 14A, FIG. 15A, FIG. 16A and FIG. 17A, are executed, the profile data acquisition processing is moved on to step 136 of FIG. 12.

If misses occur at all of the blocks of the second-level cache memory, HIT_P remains −1 as is, and therefore, the judgment in step 136 of FIG. 12 is affirmative, and rewriting of the tag information of the blocks of the first-level cache memory is carried out in step 144.

When the above-described profile data acquisition processing ends, the respective computers execute the following display processing (dumping). Namely, each computer displays, on the display section 30, the total number of hits (the final value of HIT_C) and the total number of misses (the final value of MISS_C) at the cache set of the first-level cache memory that corresponds to that device itself. Further, each computer displays the total numbers of hits (e.g., the final value of HIT_C_L20) and the total numbers of misses (e.g., the final value of MISS_C_L20) at the respective cache sets of the second-level cache memory that correspond to that device itself.

Then, for example, the profile data of the other computers 10s1 through 10sN is transmitted to the computer 10s0. On the basis of the received profile data, the computer 10s0 displays the profile data as follows. The computer 10s0 displays in a list the total number of hits and the total number of misses per cache set of the first-level cache memory, and displays in a list the total number of hits and the total number of misses of each group of the second-level cache memory. Moreover, the computer displays the total of the total numbers of hits and the total of the total numbers of misses of the second level, and displays the total of the total numbers of hits and the total of the total numbers of misses of the respective groups of the second-level cache memory.

Note that, in the above-described example, the total number of hits and the total number of misses of all of the cache sets that belong to the same group of the second-level cache memory are determined. However, the total number of hits and the total number of misses of each cache set belonging to the same group of the second-level cache memory may be determined individually and displayed. Accordingly, also when carrying out display in a list as described above, the total number of hits and the total number of misses of each cache set belonging to the same group of the second-level cache memory may be individually displayed in a list.

Effects of the third embodiment are described next.

First, the third embodiment has the effects of the first embodiment.

Further, the third embodiment can acquire profile data per cache set of the first-level cache memory. Further, the third embodiment counts the numbers of hits and misses, that correspond to a cache set of the first-level cache memory, of the second-level cache memory, and therefore, can acquire the total number of hits and the total number of misses of the second-level cache memory.

A modified example of the third embodiment is described next.

The disclosed technique is not limited to incrementing both the variable HIT_C_L20 and the variable MISS_C_L20, and, for example, may count either one of the variable HIT_C_L20 and the variable MISS_C_L20. Further, when only the variable HIT_C_L20 is incremented for example, the final value of the variable HIT_C_L20 is subtracted from the final value of the variable MISS_C that is based on step 134 of FIG. 12, and the final value of the variable MISS_C_L20 is computed. Further, when only the variable MISS_C_L20 is incremented, the final value of the variable MISS_C_L20 is subtracted from the final value of the variable MISS_C that is based on step 134 of FIG. 12, and the final value of the variable HIT_C_L20 is computed.

Fourth Embodiment

A fourth embodiment is described next.

Because the structure of the fourth embodiment is similar to the structure of the first embodiment, description thereof is omitted.

Next, operation of the fourth embodiment is described. In the fourth embodiment, the hits/misses are counted per array and profile data is acquired.

The original program for which it is desired to acquire profile data of the fourth embodiment is the same as that of the first embodiment (FIG. 2A). The profile data acquisition program of the fourth embodiment as well is substantially similar to the profile data acquisition program of the first embodiment (see FIG. 2C). An example of the profile data acquisition processing of the fourth embodiment is illustrated by flowcharts in FIG. 18 and FIG. 19. The processing illustrated in FIG. 18 and FIG. 19 is substantially similar to the profile data acquisition processing of the first embodiment (FIG. 5 and FIG. 6), and therefore, only the portions that differ are described.

Figure 18:
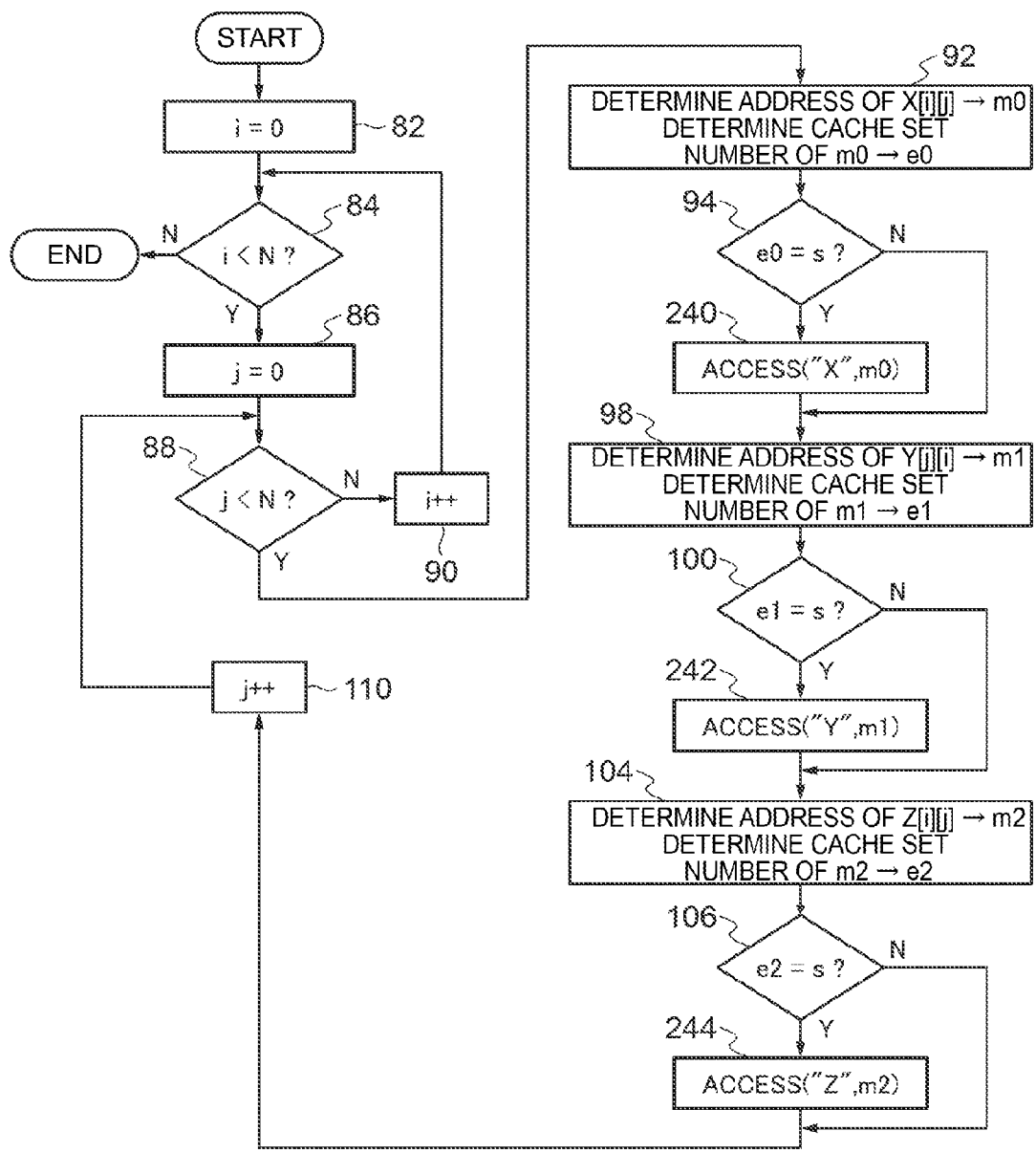
FIG. 18 is a flowchart illustrating an example of profile data acquisition processing in a fourth embodiment.
Figure 19:
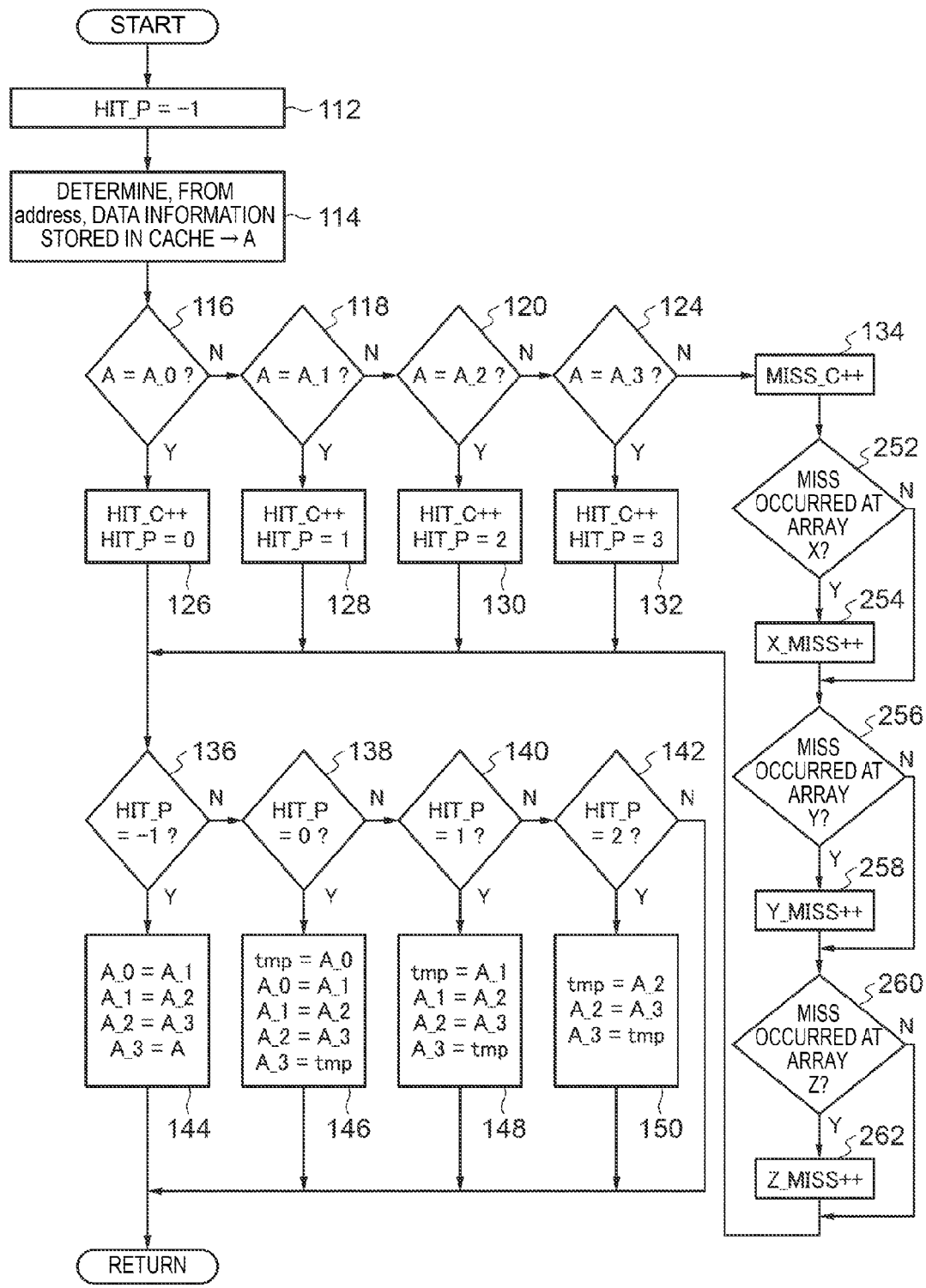
FIG. 19 is a flowchart illustrating an example of counting processing within the profile data acquisition processing of FIG. 18.

When the results of judgment of step 94 of FIG. 18 are affirmative, in step 240, the ACCESS program executing section 94A executes the counting processing that is illustrated in FIG. 19 and that counts the hits or misses. As illustrated in FIG. 19, the counting processing is substantially similar to the counting processing of the first embodiment (FIG. 6), and therefore, only the portions that differ are described. In step 134 of FIG. 19, the variable MISS_C is incremented by 1, and thereafter, in step 252, the ACCESS program executing section 94A judges whether or not the miss this time has occurred at the array X. If the miss has occurred at the array X, in step 254, the ACCESS program executing section 94A increments, by 1, variable X_MISS that expresses the number of times that a miss has occurred at array X. On the other hand, if the miss has not occurred at the array X, the results of judgment of step 252 are negative, and therefore, the processing of step 254 is skipped and the counting processing advances to step 256.

In step 256, the ACCESS program executing section 94A judges whether or not the miss has occurred at the array Y. If it is judged that the miss has occurred at the array Y, in step 258, the ACCESS program executing section 94A increments, by 1, variable Y_MISS that expresses the number of times that a miss has occurred at the array Y. On the other hand, if the miss has not occurred at the array Y, the results of judgment of step 256 are negative, and therefore, the processing of step 258 is skipped and the counting processing advances to step 260.

In step 260, the ACCESS program executing section 94A judges whether or not the miss has occurred at the array Z. If the miss has occurred at the array Z, in step 262, the ACCESS program executing section 94A increments, by 1, variable Z_MISS that expresses the number of times that a miss has occurred at the array Z. If the miss has not occurred at the array Z, the results of judgment of step 260 are negative, and therefore, the processing of step 262 is skipped and the counting processing advances to step 136.

The processings of steps 254, 258, 262 are examples of the contents of updating the array miss variables of the disclosed technique.

After the processing of step 240 (FIG. 18) is executed as described above, the respective processings of above-described step 98 and step 100 are executed, and the counting processing advances to step 242. Because the processing of step 242 is similar to the processing of step 240, description thereof is omitted.

After the processing of step 242 is executed as described above, the respective processings of above-described step 104 and step 106 are executed, and the counting processing advances to step 244. Because the processing of step 244 is similar to the processing of step 240, description thereof is omitted.

Here, the respective processings of step 240, step 242 and step 244 in FIG. 18 are the same, but the reason why the notations ACCESS("X", m0), ACCESS("Y", m1), ACCESS ("Z", m2) are used in FIG. 18 is as follows.

Due to the processing of step 92, a miss is judged for array X in step 240. Due to the processing of step 98, a miss is judged for array Y in step 242. Moreover, due to the processing of step 104, a miss is judged for array Z in step 244. The notations mentioned above are used because the processings of counting the hits or missed are carried out in different steps in accordance with the different array in which a miss has occurred.

When the profile data acquisition processing ends as described above, the respective computers execute display processing (dumping) as follows. Namely, in the same way as in the first embodiment, each computer displays the total number of hits and the total number of misses. Further, in the fourth embodiment, because the total number of misses is acquired per array, each computer displays the total number of misses per array at the cache set that corresponds to that device itself. Moreover, the computer 10s0 displays the total number of misses per array at the entire cache memory, on the basis of the profile data received from the other computers 10s1 through 10sN.

Effects of the fourth embodiment are described next.

First, the fourth embodiment has the effects of the first embodiment.

Moreover, the fourth embodiment further computes the number of misses per array at each cache set. Therefore, the total number of misses per array can be acquired.

Note that the total number of hits may be counted for each array, and may be displayed in the same way as the display of the total number of misses.

Fifth Embodiment

A fifth embodiment is described next.

Because the structure of the fifth embodiment is similar to the structure of the first embodiment, description thereof is omitted. Note that, for example, the position where a prefetch command, that reads-out data that is several ahead in the array X, is located, and information of a parameter thereof, are stored in the database 12 of the fifth embodiment. Here, the position where the prefetch command is located is, for example, the position of the third data source as depicted in original program P005 in FIG. 20A. Further, the parameter expresses data of which position ahead is to be read-out from the main memory. For example, this is data of the memory region that is $64^{th}$ ahead.

In the fifth embodiment, the executing section verifies the results of prefetching in a case in which a prefetch command is inserted into the program. Namely, by reading out data of the memory region that is $64^{th}$ ahead in the main memory and storing this data in the cache memory in advance, it can be verified whether this data can be read-out from the cache memory in a case in which this data must be read-out due to execution of the program.

Figure 21:
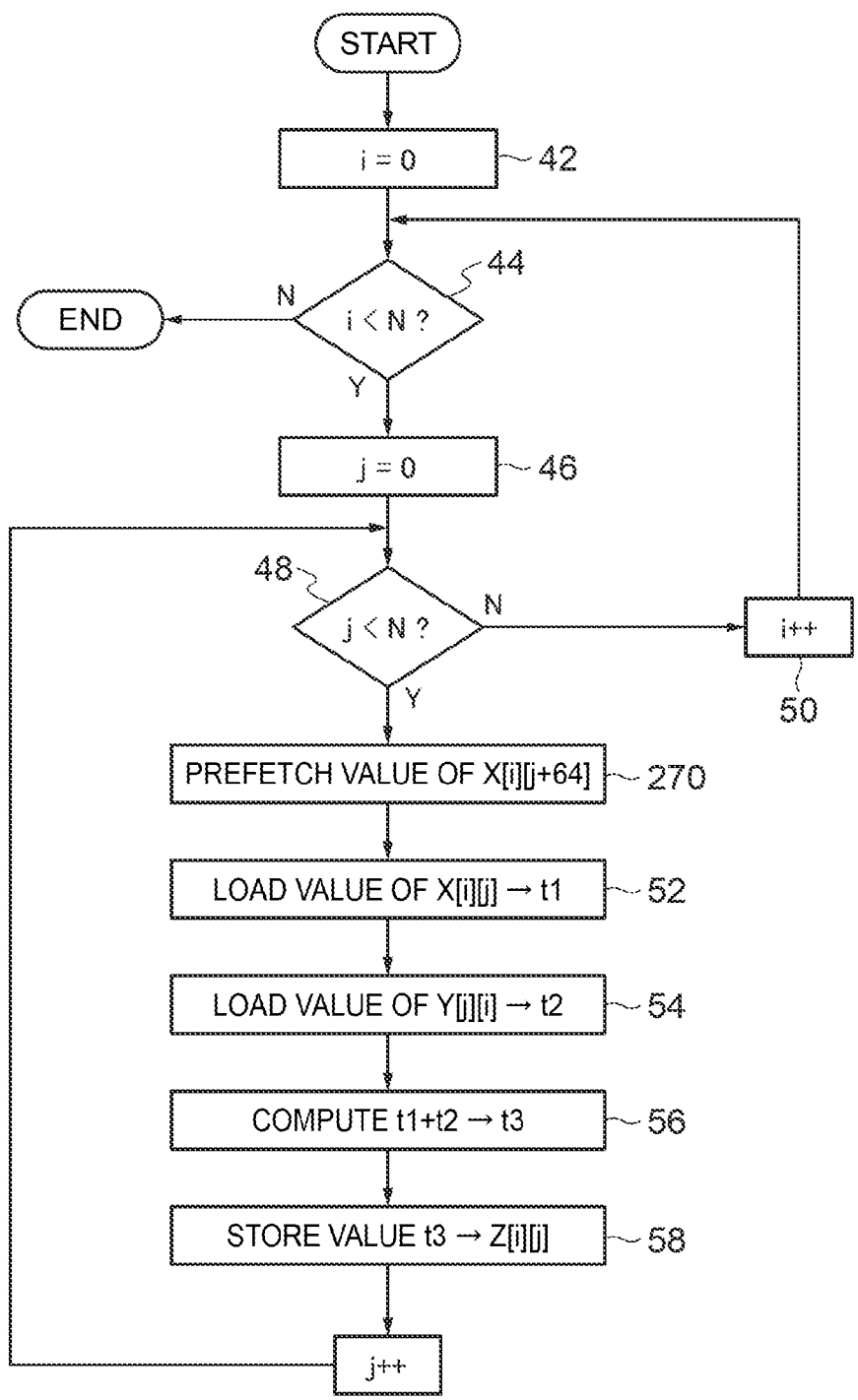
FIG. 21 is a flowchart illustrating an example of addition processing in accordance with the original program into which the prefetch command has been inserted, in the fifth embodiment.

As illustrated in FIG. 20A, the original program P005 for which it is desired to acquire profile data is substantially similar to the original program P001 of the first embodiment (see FIG. 2A), and therefore, only the portions that differ are described. In the original program P005, source code C10, that commands reading-out of data, in the array X, of the memory region of the main memory that is identified by variable i and variable j+64, is placed between the source code C2 and the source code C3. The original program P005 differs from the original program P001 of the first embodiment with regard to this point. An example of addition processing of the original program P005 of the fifth embodiment is illustrated in FIG. 21. The addition processing of the fifth embodiment (FIG. 21) differs from the addition processing of the first embodiment (FIG. 3) with regard to the point that, if the results of judgment of step 48 of the addition processing of the first embodiment are affirmative, processing of step 270 is executed before the processing of step 52. Namely, in step 270, the executing section reads-out the value of the address of the array X that is identified by variable i and variable j+64.

The original program P005 is converted by a program converting program that is the same as the program converting program of the first embodiment. The profile data acquisition program obtained by the original program P005 being converted is depicted in FIG. 20C. The source codes C1, C2, C3, C4 and C5 of the original program P005 of the fifth embodiment are similar to the source codes C1, C2, C3, C4 and C5 of the original program P001 of the first embodiment. Accordingly, in the same way as in the first embodiment, as depicted in FIG. 20C, the program statements C1, C2, C3-1 (X) through C3-3(Z), C4 and C5 are generated. Because the source code C10 of the original program P005 of the fifth embodiment is classified as Y4, program statements C10-1 and C10-2 are generated in step 75 (see FIG. 20B). Then, in step 76 (see FIG. 20B), program statement C10-3 is generated.

Figure 22:
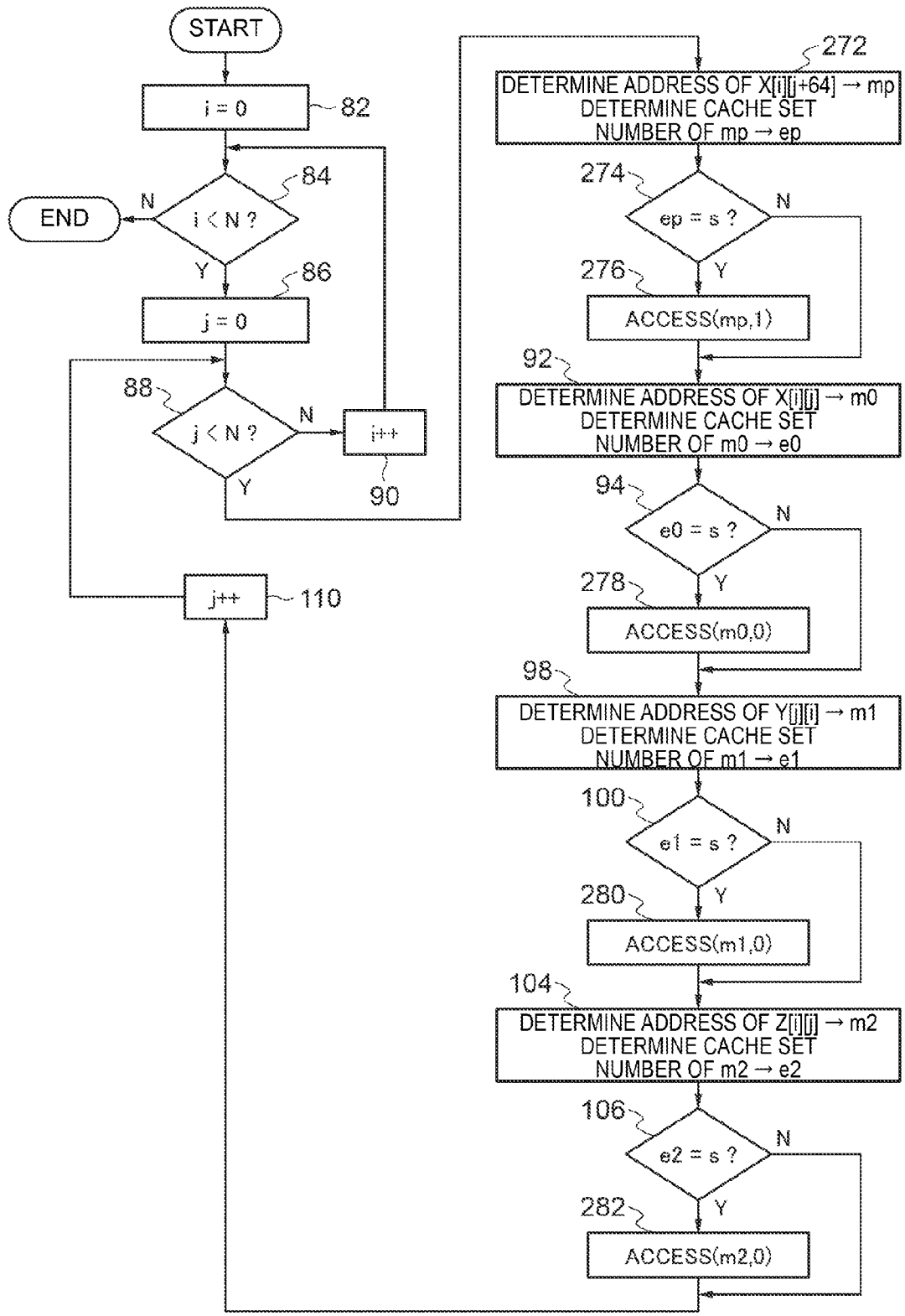
FIG. 22 is a flowchart illustrating an example of profile data acquisition processing in the fifth embodiment.
Figure 23:
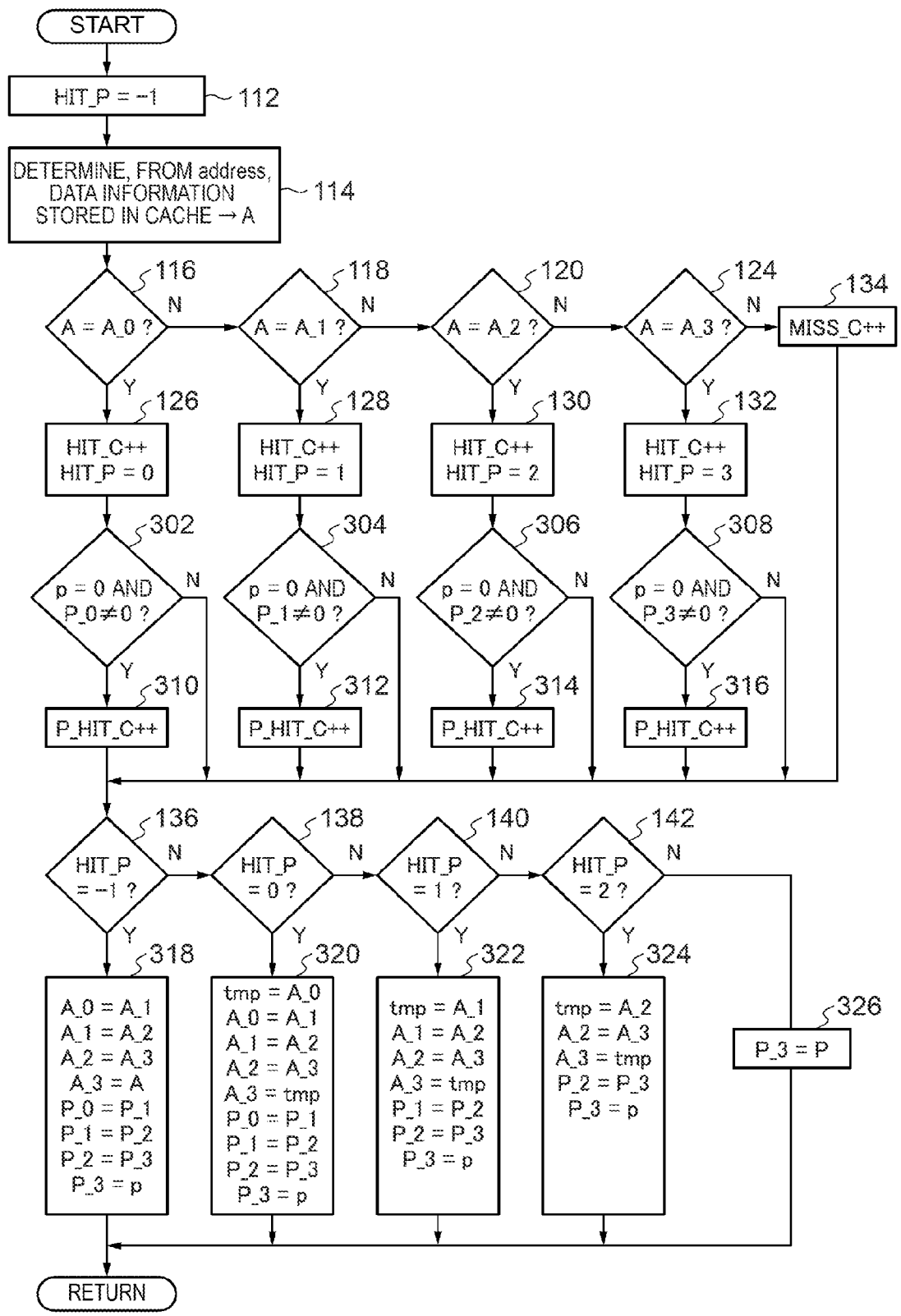
FIG. 23 is a flowchart illustrating an example of counting processing within the profile data acquisition processing of FIG. 22.

An example of the profile data acquisition processing of the fifth embodiment is illustrated in FIG. 22 and FIG. 23. Because the profile data acquisition processing illustrated in FIG. 22 and FIG. 23 is substantially similar to the example of the profile data acquisition processing of the first embodiment (FIG. 5 and FIG. 6), only the portions that differ are described. If the results of judgment in step 88 are affirmative, in step 272, the address computing section 91A determines the address of the memory region on the main memory of the array X that is identified by variables i and j+64, and substitutes the address in for mp. The set number computing section 92A determines the cache set number of the cache memory that corresponds to the address mp that was substituted-in for mp, and substitutes the cache set number in for ep.

In step 274, the set number judging section 93A judges whether or not the cache set number ep is the set number s of the cache set that the profile data acquisition processing handles. If the cache set number ep is s, in step 276, the ACCESS program executing section 94A executes counting processing that counts the hits or misses and that is described later. After the processing of step 276, or if results of judgment of step 274 are negative, the profile data acquisition processing advance to step 92. The processing of step 92 is executed, and, if the results of judgment of step 94 are affirmative, in step 278, the ACCESS program executing section 94A executes counting processing of the hits or misses of array X that is identified by the variable i and the variable j. Note that the processing of step 278 is similar to the processing of step 276.

The processing of step 274 is an example of carrying out a judgment in advance on non-judged data in the present disclosed technique.

After the processing of step 278, the profile data acquisition processing advances to step 98. If the results of judgment of step 100 are affirmative, in step 280, the ACCESS program executing section 94A executes counting processing that counts the hits or misses of array Y that is identified by the variable j and the variable i. The processing of step 280 is similar to the processing of step 276.

After the processing of step 280, the profile data acquisition processing advances to step 104. If the results of judgment of step 106 are affirmative, the ACCESS program executing section 94A executes the processing of step 282. The processing of step 282 is similar to the processing of step 276.

Here, the respective processings of steps 276, 278, 280 and step 282 in FIG. 22 are the same, but the notations ACCESS (mp, 1), ACCESS(m0, 0), ACCESS(m1, 0), and ACCESS (m2, 0) are used in FIG. 22. This is for the following reason. Due to the processing of step 272, a hit or a miss is judged for the prefetched array X. Due to the processing of step 92, a hit or a miss is judged for the array X in step 278. Further, due to the processing of step 98, a hit or a miss is judged for the array Y in step 280. Moreover, due to the processing of step 104, a hit or a miss is judged for the array Z in step 282. The notations mentioned above are used because the counting processings are carried out in accordance with the prefetched array X and the arrays X through Z.

The counting processing of the fifth embodiment is described next with reference to FIG. 23. When the processing of step 126 is executed, in step 302, the ACCESS program executing section 94A judges whether or not the following two conditions are satisfied. The first condition is the condition that the accessing of this time is not accessing that is based on the prefetch command (p=0). The second condition is the condition that the tag information at which there is a hit this time is address information that was stored in the first block 170A0 due to access based on the prefetch command (P_0 is not 0).

If both the first condition and the second condition are satisfied, this is a case in which a hit has occurred in the accessing of this time at the tag information that was recorded in the first block 170A0 due to previous prefetching. In this case, step 302 is affirmative, and the counting processing is moved on to step 310. In step 310, the ACCESS program executing section 94A increments, by 1, variable P_HIT_C that expresses that there is a hit at data that was acquired by the prefetch command. Note that, if it is judged that at least one of the first condition and the second condition is not satisfied, the counting processing skips the processing of step 310. After the processing of step 310 is executed, or if the judgment in step 302 is negative, the counting processing is moved on to step 136.

When the processing of step 128 is executed, in step 304, the ACCESS program executing section 94A judges whether or not the following two conditions are satisfied. The first condition is the condition that the accessing of this time is not accessing that is based on the prefetch command (p=0). The second condition is the condition that the tag information at which there is a hit this time is tag information that was stored in the second block 170A1 due to access based on the prefetch command (P__1 is not 0).

If both the first condition and the second condition are satisfied, step 304 is affirmative, and the counting processing is moved on to step 312. In step 312, the ACCESS program executing section 94A executes processing that increments, by 1, the variable P_HIT_C that expresses that there is a hit at data that was acquired by the prefetch command. Note that, if it is judged that at least one of the first condition and the second condition is not satisfied, the counting processing skips the processing of step 312. After the processing of step 312 is executed, or if the judgment in step 304 is negative, the counting processing is moved on to step 136.

When the processing of step 130 is executed, in step 306, the ACCESS program executing section 94A judges whether or not the following two conditions are satisfied. The first condition is the condition that the accessing of this time is not accessing that is based on the prefetch command (p=0). The second condition is the condition that the tag information at which there is a hit this time is tag information that was stored in the third block 170A2 due to access based on the prefetch command (P__2 is not 0).

If both the first condition and the second condition are satisfied, step 306 is affirmative, and the counting processing is moved on to step 314. The processing of step 314 is similar to step 310. Note that, if it is judged that at least one of the first condition and the second condition is not satisfied, the counting processing skips the processing of step 314. After the processing of step 314 is executed, or if the judgment in step 306 is negative, the counting processing is moved on to step 136.

When the processing of step 132 is executed, in step 308, the ACCESS program executing section 94A judges whether or not the following two conditions are satisfied. The first condition is the condition that the accessing of this time is not accessing that is based on the prefetch command (p=0). The second condition is the condition that the address information at which there is a hit this time is address information that was stored in the fourth block 170A3 due to access based on the prefetch command (P__3 is not 0).

If both the first condition and the second condition are satisfied, step 308 is affirmative, and the counting processing is moved on to step 316. The processing of step 316 is similar to the processing of step 310. Note that, if it is judged that at least one of the first condition and the second condition is not satisfied, the counting processing skips the processing of step 316. After the processing of step 316 is executed, or if the judgment in step 308 is negative, the counting processing is moved on to step 136.

The processings of steps 302 through 308 are examples of the contents of the judgment of the hit judging section of the disclosed technique. The processings of steps 310 through 316 are examples of updating the advance storage hit variable of the disclosed technique.

If there is an affirmative judgment in step 136, the ACCESS program executing section 94A executes a first processing and a second processing in step 318. Here, the first processing is similar to step 144 (see FIG. 6). Namely, as illustrated in FIG. 7A, the tag information of the second block 170A1 through the fourth block 170A3 are made to replace the tag information of the first block 170A0 through the third block 170A2. Further, the tag information that is obtained by the accessing of this time is made to replace the tag information of the fourth block 170A3. The second processing is processing in which, accompanying the rewriting of the data stored in the respective blocks, the tag information that are stored in the respective blocks are rewritten in for value p that expresses whether the tag information was acquired on the basis of the prefetch command. Tag information is stored in the first block 170A0 through the fourth block 170A3. In the fifth embodiment, tag information that is obtained on the basis of the prefetch command also is stored in the tag storage region. Thus, in the fifth embodiment, the value p, that expresses whether or not tag information stored in a tag storage region is data that was obtained on the basis of the prefetch command, is stored in each of the blocks 170A0 through 170A3. For example, when tag information that is stored in the first block 170A0 is data that has been acquired on the basis of the prefetch command, the following data is stored in the first block 170A0. Namely, 1, that expresses that the tag information is data that has been acquired on the basis of the prefetch command, is further stored in addition to this tag information. Note that, if the tag information stored in the first block 170A0 is not data acquired on the basis of the prefetch command, the following data is stored in the first block 170A0. Namely, 0, that expresses that the tag information is not data that has been acquired on the basis of the prefetch command, is further stored in addition to this tag information. If replacement of the tag information of the respective blocks has been carried out by the first processing, the values p, that express whether or not the tag information of the first block 170A0 through the fourth block 170A3 after this replacement has been acquired on the basis of the prefetch command, also must be replaced. Thus, as the second processing, the ACCESS program executing section 94A, accompanying the replacement of the tag information of the blocks, also replaces the values that express whether or not these tag information has been acquired on the basis of the prefetch command.

Whether or not the tag information of the second block 170A1, that is made to replace the tag information of the first block 170A0, that has been acquired on the basis of the prefetch command is expressed by P__1. The tag information of the second block 170A1 is made to replace the tag information of the first block 170A0. Accordingly, as the second processing, the executing section replaces P__0 with the value of P__1 that expresses whether or not the tag information of the first block 170A0 has been acquired on the basis of the prefetch command.

Thereafter, similarly, P__3 is made to replace P__2 and value p, that expresses whether or not the address information obtained by the accessing of this time is address information that is based on the prefetch command, is made to replace P__3.

The processing of step 318 is an example of the contents of storing the address information, that corresponds to the non-judged data, in the storage section in advance in the disclosed technique.

If the results of judgment of step 138 are affirmative, in step 320, the ACCESS program executing section 94A executes a third processing and a fourth processing. The processing of step 146 (see FIG. 6) is executed as the third processing. As the fourth processing, accompanying the rewriting of the tag information of the respective blocks 170A0 through 170A3 by the third processing, the ACCESS program executing section 94A carries out replacement as follows. Namely, the respective values P__1 through P__3 at the second block 170A1 through the fourth block 170A3 are replaced-in in place of the values P__0 through P__2 of the first block 170A0 through the third block 170A2. Further, the value p, that corresponds to the data acquired this time, is made to replace the value P__3 of the fourth block 170A3.

If the results of judgment of step 140 are affirmative, in step 322, a fifth processing and a sixth processing are executed. The processing of step 148 (see FIG. 6) is executed as the fifth processing. As the sixth processing, accompanying the rewriting of the data of the second block 170A1 through the fourth block 170A3 by the fifth processing, the ACCESS program executing section 94A carries out replacement as follows. Namely, the value P_2 and the value P_3 at the third block 170A2 and the fourth block 170A3 are respectively replaced-in in place of the value P_1 and the value P_2 of the second block 170A1 and the third block 170A2. Further, the value p, that corresponds to the address information acquired this time, is replaced-in in place of the value P_3 of the fourth block 170A3.

If the results of judgment of step 142 are affirmative, in step 324, a seventh processing and an eighth processing are executed. The processing of step 150 (see FIG. 6) is executed as the seventh processing. As the eighth processing, accompanying the rewriting of the address information of the fourth block 170A3 by the seventh processing, the ACCESS program executing section 94A carries out replacement as follows. Namely, the value P_3 at the fourth block 170A3 is replaced-in in place of the value P_2 of the third block 170A2. Further, the value p, that corresponds to the data acquired this time, is replaced-in in place of the value P_3 of the fourth block 170A3. If the results of judgment of step 142 are negative, HIT_P=3. In this case, in step 326, the value p corresponding to the data acquired this time is made to replace the value P_3 of the fourth block 170A3.

When the above-described profile data acquisition processing ends, the respective computers execute the following display processing (dumping). Namely, each computer displays the total number of hits (the final value of HIT_C) of the cache set corresponding to that device itself, and the total number of misses (the final value of MISS_C), and the total number of times that a hit has occurred due to prefetching (the final value of P_HIT_C).

Further, for example, the profile data of the other computers 10s1 through 10sN are transmitted to the computer 10s0. On the basis of the received profile data, the computer 10s0 displays, in a list, the total number of hits per cache set, the total number of misses, and the total number of times a hit occurred due to prefetching.

Effects of the fifth embodiment are described next.

First, the fifth embodiment has the effects of the first embodiment.

Further, the fifth embodiment acquires, per cache set, the total number of times that a hit has occurred due to prefetching. Therefore, as a result of specifying the position where the prefetch command is located and the parameter, verification of the prefetching, such as whether the total number of hits has improved or the like, can be carried out.

Note that, in the above-described example, the data of the memory region that is $64^{th}$ ahead is prefetched for array X. However, for example, data of the memory region that is $50^{th}$ ahead or $100^{th}$ ahead may be prefetched for another array, e.g., array Y.

Sixth Embodiment

A sixth embodiment is described next.

Figure 24:
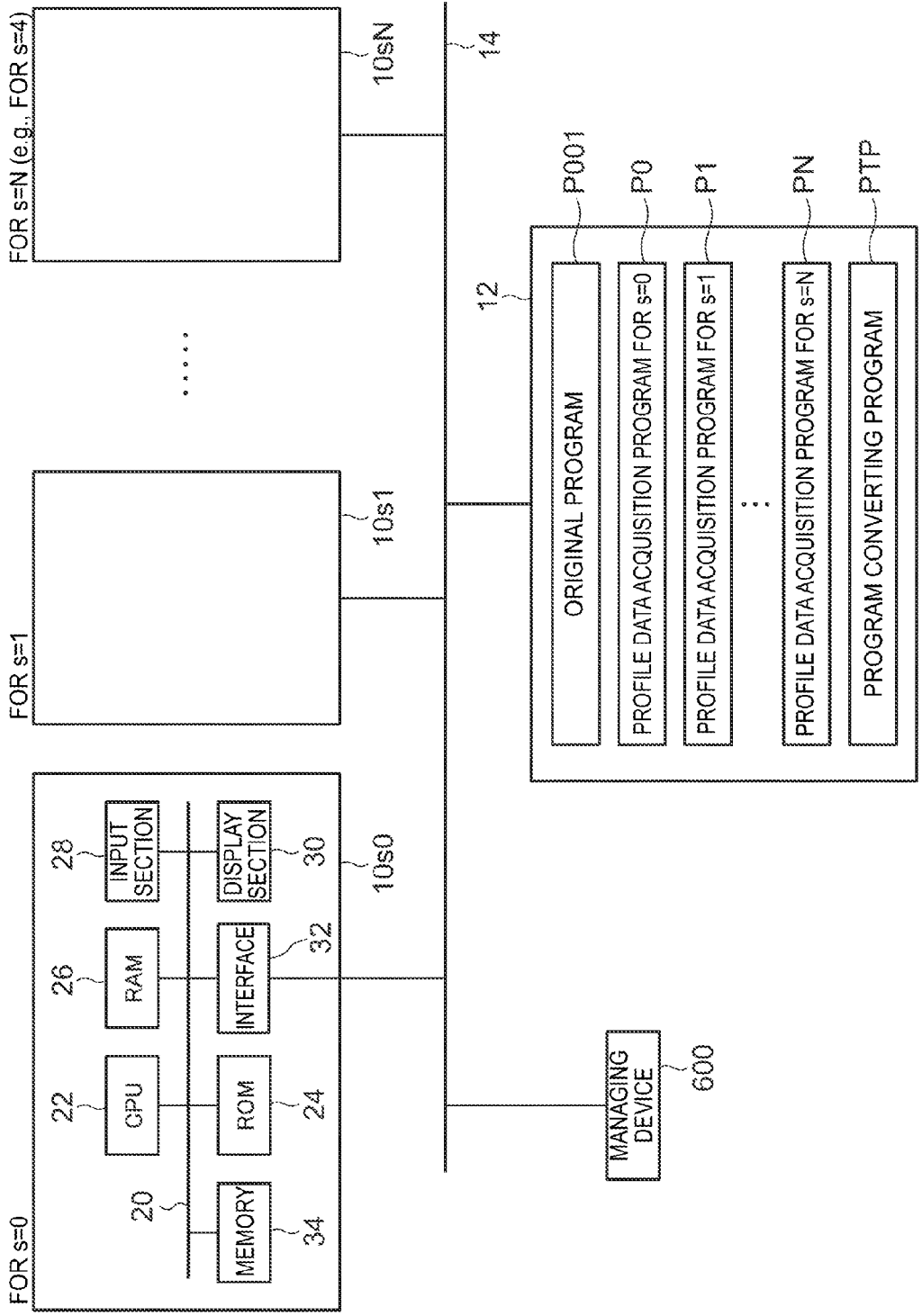
FIG. 24 is a block diagram depicting a prefetch verification system that verifies the results of improvement of execution time due to insertion of a prefetch command into an original program, in a sixth embodiment.

Because the sixth embodiment is substantially the same as the first embodiment, only the portions that differ are described with reference to FIG. 24. In the sixth embodiment, a managing device 600, that manages the respective computers 10s0 through 10sN, is connected to the respective computers 10s0 through 10sN via the network 14. The structure of the managing device 600 is similar to that of the respective computers 10s0 through 10sN.

Note that the system of the sixth embodiment is an example of the program change verification system of the disclosed technique. The managing device 600 is an example of the managing device of the disclosed technique.

Figure 25A:
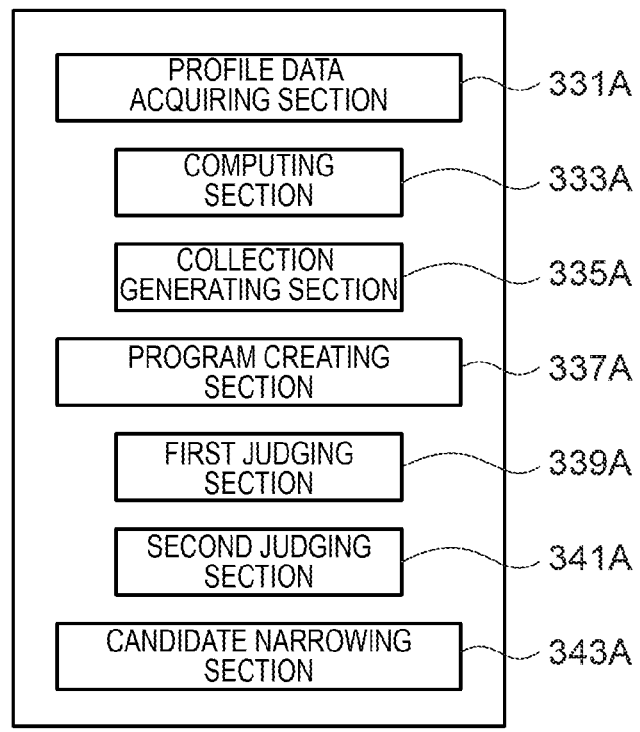
FIG. 25A is a drawing depicting an example of a prefetch verification program.
Figure 25B:
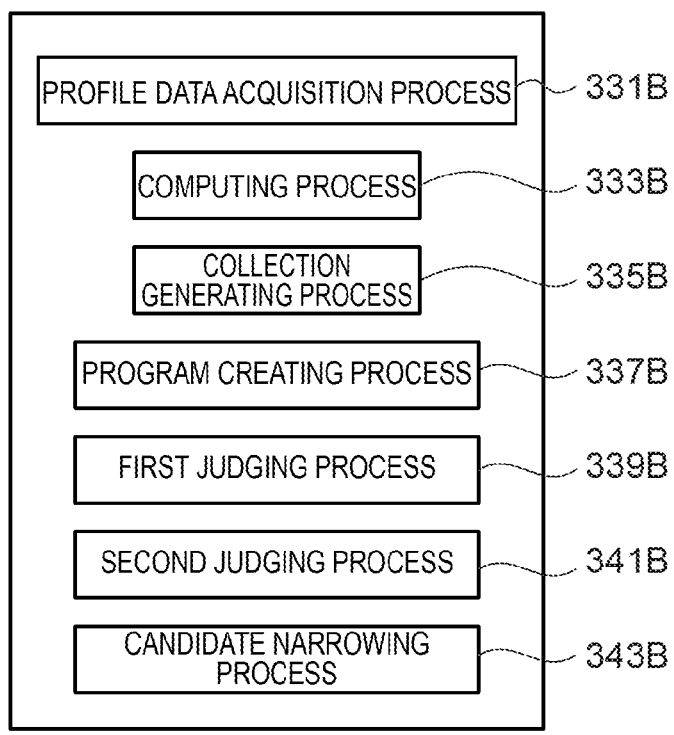
FIG. 25B is a drawing depicting an example of a prefetch verification process.

As depicted in FIG. 25A, a prefetch verification program has a profile data acquiring section 331A, a computing section 333A, a collection generating section 335A, a program creating section 337A, a first judging section 339A, a second judging section 341A and a candidate narrowing section 343A. Further, as depicted in FIG. 25B, the prefetch verification processing has a profile data acquisition process 331B, a computing process 333B, and a collection generating process 335B. Further, the prefetch verification processing has a program creating process 337B, a first judging process 339B, a second judging process 341B and a candidate narrowing process 343B. Note that the CPU 22 operates as the above-described respective sections 331A through 343A of FIG. 25A by executing the above-described processes 331B through 343B respectively.

Figure 26:
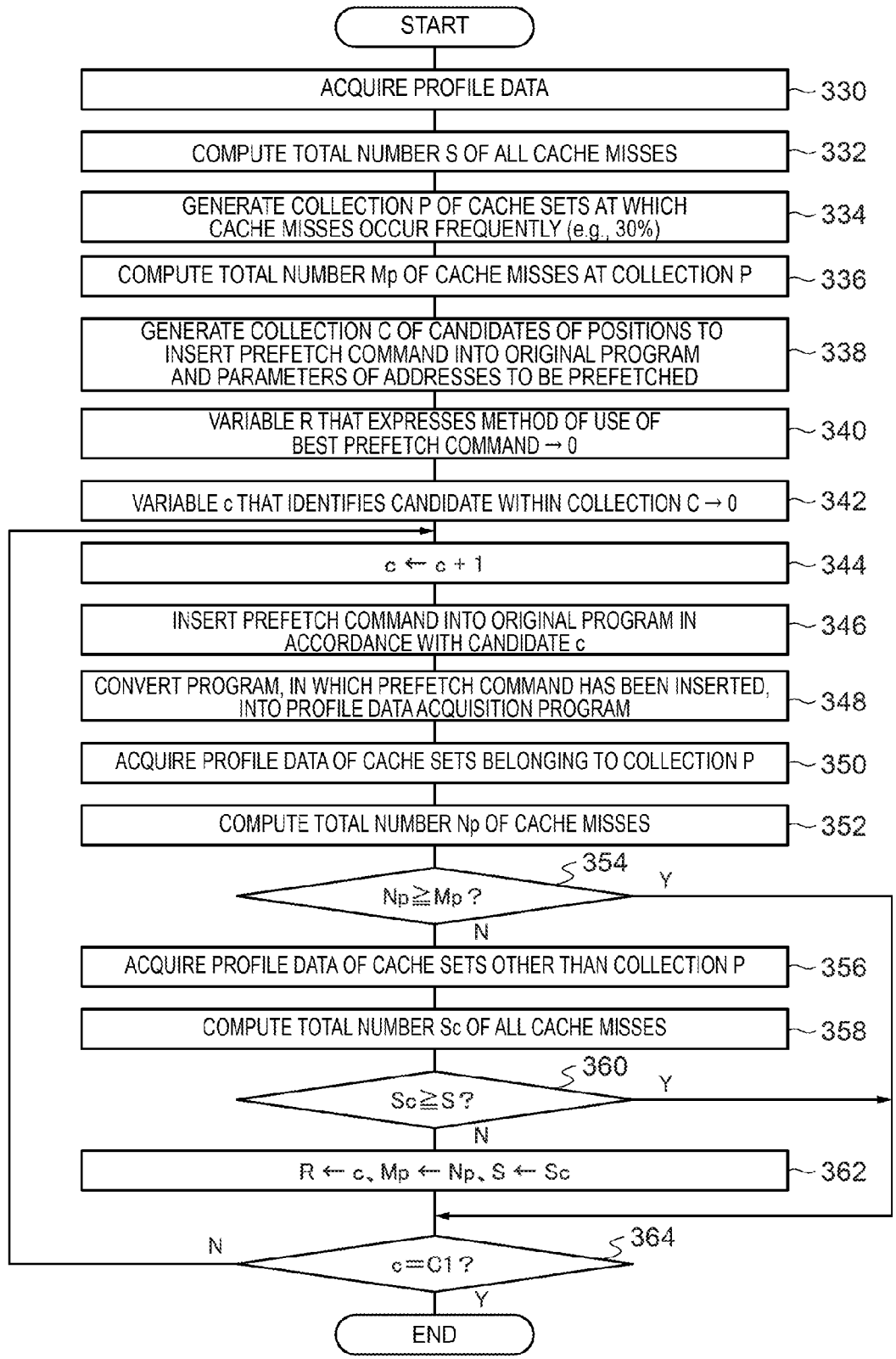
FIG. 26 is a flowchart illustrating an example of prefetch verification processing in the sixth embodiment.

Operation of the sixth embodiment is described next with reference to FIG. 26 that illustrates an example of the prefetch verification processing.

In step 330, due to the managing device instructing the respective computers 10s0 through 10sN, the respective computers 10s0 through 10sN are made to execute the profile data acquisition processing of any of the above-described first embodiment through fourth embodiment, and profile data are acquired thereby. In step 332, on the basis of the acquired profile data, the computing section 333A computes a total number S of cache misses of all of the cache sets of the cache memory. In step 334, on the basis of the acquired profile data, the collection generating section 335A generates a collection P of cache sets at which cache misses occur frequently, e.g., greater than or equal to 30% (such as 35% or 40%). In step 336, on the basis of the acquired profile data, the computing section 333A computes a total number Mp of cache misses in the collection P.

In step 338, the collection generating section 335A generates a collection C of candidates of positions where a prefetch command is to be inserted in the original program and parameters of addresses that are to be prefetched. In step 340, the program creating section 337A initializes variable R, that expresses the method of use of the best prefetch command, to 0. In step 342, the program creating section 337A initializes variable c, that identifies a candidate within the collection C, to 0. In step 344, the program creating section 337A increments the variable c by 1. In step 346, the program creating section 337A inserts a prefetch command into the original program in accordance with candidate c that is identified by the variable c. In step 348, the program creating section 337A converts the program, into which the prefetch command is inserted, into a profile data acquisition program by a program that is similar to the program converting program of the first embodiment.

In step 350, the profile data acquiring section 331A causes the computers, that correspond to the cache sets that belong to the collection P, to execute the profile data acquisition programs corresponding to those computers. Due thereto, profile data of the cache sets belonging to the collection P are acquired. In step 352, the computing section 333A computes a total number Np of cache misses of the cache sets that belong to the collection P. In step 354, the first judging section 339A judges whether or not the total number Np is greater than or equal to the total number Mp. If the total number Np is greater than or equal to the total number Mp, a reduction in the number of times cache misses occur due to the insertion of the prefetch command at candidate c cannot be expected. In this case, the results of judgment of step 354 are affirmative, and, in order to test the next candidate, the improving processing advances to step 364. On the other hand, if the total number Np is less than the total number Mp, a reduction in the number of times cache misses occur due to the insertion of the prefetch command can be expected. In this case, the improving processing advances to step 356.

In step 356, the profile data acquiring section 331A causes the computers, that correspond to the cache sets other than the collection P, to execute the profile data acquisition programs corresponding to those computers. Due thereto, the profile data of the cache sets other than the collection P are acquired.

In step 358, the computing section 333A computes a total number Sc of cache misses of all of the cache sets of the cache memory.

In step 360, the second judging section 341A judges whether or not the total number Sc is greater than or equal to the total number S. If the total number Sc is greater than or equal to the total number S, this means that the number of times that caches misses occur will not decrease even if a prefetch command is inserted. In this case, the results of judgment of step 360 are affirmative, and, in order to test the next candidate, the improving processing advances to step 364. On the other hand, if the total number Sc is less than the total number S, this means that the number of times that cache misses occur will decrease by inserting a cache operation command. In this case, the results of judgment of step 360 are negative, and the improving processing advances to step 362.

In step 362, the candidate narrowing processing section 343A substitutes candidate c in for the variable R, and substitutes the total number Np in for the total number Mp, and substitutes the total number Sc in for the total number S. In step 364, the candidate narrowing section 343A judges whether or not the number c of candidates is equal to a total number C1 of candidates. If the number c of candidates is not equal to the total number C1 of candidates, there exists a candidate at which there is the possibility of improving the misses. Therefore, the improving processing returns to step 344, and the above-described processings (steps 344 through 364) are executed. If the number c of candidates is equal to the total number C1 of candidates, no candidate at which there is the possibility of improving the hits/misses exists, and therefore, the improving processing ends.

Steps 334, 336, 346, 348, 350, 352, 354 are examples of the contents carried out by the managing device of the disclosed technique.

Effects of the sixth embodiment are described next.

In the sixth embodiment, profile data, in respective cases of varying in different ways the position at which a prefetch command is inserted and the parameter, are acquired by any of the methods of the above-described first embodiment through fourth embodiment. Accordingly, it can be verified whether misses will improve when a prefetch command is inserted at what position and to what extent of a parameter. Accordingly, even if there exist numerous candidates of positions to insert a prefetch command and parameters, the time required for narrowing down the candidates can be greatly shortened.

In the above-described example, the profile data is acquired (step 350) only in the case of cache sets at which cache misses occur frequently, and it is verified whether the misses are improving (step 354). In a case in which it is verified at this level whether the misses are improving, steps 356 through 360 may be skipped, and the improving processing may move on to step 362. Because steps 356 through 360 are skipped in this way, the time required in order to narrow down the candidates can be shortened more.

One embodied aspect has the effect that profile data per cache set can be acquired.

All publications, patent applications, and technical standards mentioned in this specification are herein incorporated by reference to the same extent as if such individual publication, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions and alterations could be made hereto without departing from the spirit and scope of the invention.

What is claimed is:

1. A variable updating device comprising:
  a processor; and
  a memory storing instructions, which, when executed by the processor, perform a procedure, the procedure including:
  (a) with respective data of a plurality of data that correspond respectively to any of a plurality of memory regions of a main memory, which correspond respectively to any of cache sets of a cache memory that has a plurality of the cache sets that are storage regions, the respective data being data that are objects of judgment, judging whether or not the cache set that corresponds to the data that is the object of judgment is a cache set selected in advance;
  (b) in a case in which the corresponding cache set is judged in (a) to be the cache set selected in advance, judging which of (1) a hit that expresses that address information of the memory region corresponding to the data that is the object of judgment is stored in a storage portion that is provided in correspondence with the cache set selected in advance, or (2) a miss that expresses that address information of the memory region corresponding to the data that is the object of judgment is not stored in the storage portion, has occurred; and
  (c) carrying out a first processing that, in a case in which it is judged in (b) that the miss has occurred, updates a miss variable that expresses a number of times that misses have occurred and stores the address information in the storage portion, or a second processing that, in a case in which it is judged in (b) that the hit has occurred, updates a hit variable that expresses a number of times that hits have occurred, wherein the plurality of data are data of a plurality of sequences, and
  in (b), the judgment is carried out with the respective data of each of the plurality of sequences being the data that is the object of judgment, wherein,
  in (b), in a case in which a value of data that is an object of judgment of one sequence among the plurality of sequences is greater than a value of data that is an object of judgment of another sequence, the judgment is carried out on the data that is the object of judgment of yet another sequence.

2. The variable updating device of claim 1, wherein the plurality of data are data of at least one sequence.

3. The variable updating device of claim 1, wherein:
the cache set has a plurality of blocks,
the storage portion has a plurality of storage blocks that correspond to the plurality of blocks, and
in (c), the plurality of storage blocks are rewritten such that address information of a number equal to a number of the storage blocks, including address information of the memory region corresponding to the data that is the object of judgment, are stored in order from oldest first.

4. The variable updating device of claim 2, wherein the procedure includes:
(d) in a case in which it is judged in (b) that the miss has occurred, judging whether or not the address information is stored in any of a plurality of corresponding storage portions that are provided respectively in correspondence with the storage portions and that store the address information, and
in (c), carrying out a third processing that, in a case in which it is judged in (d) that the address information is stored in any of the plurality of corresponding storage portions, updates a corresponding hit variable that expresses a number of times that this judgment has been reached, or a fourth processing that, in a case in which it is judged in (d) that the address information is not stored in any of the plurality of corresponding storage portions, updates a corresponding miss variable that expresses a number of times that this judgment has been reached.

5. The variable updating device of claim 1, wherein:
a sequence hit variable that expresses a number of times that hits have occurred and a sequence miss variable that expresses a number of times that misses have occurred are determined in correspondence with each of the plurality of sequences, and
in (c), in a case in which a hit occurs in any of the plurality of sequences, the sequence hit variable corresponding to the sequence is updated, and, in a case in which a miss occurs in any of the plurality of sequences, the sequence miss variable corresponding to the sequence is updated.

6. The variable updating device of claim 1, wherein:
in (b), the judgment is carried out in a predetermined order on the respective data of each of the plurality of sequences, and, for a sequence that is selected from among the plurality of sequences, the judgment is carried out in advance on each of non-judged data for which the judgment has not been carried out in the order, and
in (c), for the selected sequence, in a case in which the miss occurs, the address information corresponding to the non-judged data is stored in advance in the storage portion.

7. The variable updating device of claim 6, wherein the procedure includes:
(e) in a case in which it is judged in (b) that the hit has occurred, judging whether or not the hit has occurred on the basis of the address information that is stored in advance in the storage portion and that corresponds to the non-judged data;
an advance storage hit variable, that expresses a number of times that the hits have occurred, is determined on the basis of the address information that is stored in advance in the storage portion and that corresponds to the non-judged data; and
in (c), in a case in which it is judged on the basis of the address information that corresponds to the non-judged data, that the hit has occurred, the advance storage hit variable is updated.

8. The variable updating device of claim 1, wherein the procedure includes (f) displaying a value of the miss variable.

9. A variable updating method comprising:
(a) with respective data of a plurality of data that correspond respectively to any of a plurality of memory regions of a main memory that correspond respectively to any of cache sets of a cache memory that has a plurality of the cache sets that are storage regions, being data that are objects of judgment, judging whether or not the cache set that corresponds to the data that is the object of judgment is a cache set selected in advance;
(b) in a case in which the corresponding cache set is judged in (a) to be the cache set selected in advance, judging which of (1) a hit that expresses that address information of the memory region corresponding to the data that is the object of judgment is stored in a storage portion that is provided in correspondence with the cache set selected in advance, or (2) a miss that expresses that address information of the memory region corresponding to the data that is the object of judgment is not stored in the storage portion, has occurred; and
(c) carrying out a first processing that, in a case in which it is judged in (b) that the miss has occurred, updates a miss variable that expresses a number of times that misses have occurred and stores the address information in the storage portion, or a second processing that, in a case in which it is judged in (b) that the hit has occurred, updates a hit variable that expresses a number of times that hits have occurred, wherein the plurality of data are data of a plurality of sequences, and
in (b), the judgment is carried out with the respective data of each of the plurality of sequences being the data that is the object of judgment, wherein,
in (b), in a case in which a value of data that is an object of judgment of one sequence among the plurality of sequences is greater than a value of data that is an object of judgment of another sequence, the judgment is carried out on the data that is the object of judgment of yet another sequence.

10. A non-transitory recording medium having stored therein a variable updating program for causing a computer to execute a process, the process comprising:
(a) with respective data of a plurality of data that correspond respectively to any of a plurality of memory regions of a main memory that correspond respectively to any of cache sets of a cache memory that has a plurality of the cache sets that are storage regions, being data that are objects of judgment, judging whether or not the cache set that corresponds to the data that is the object of judgment is a cache set selected in advance;
(b) in a case in which the corresponding cache set is judged in (a) to be the cache set selected in advance, judging which of (1) a hit that expresses that address information of the memory region corresponding to the data that is the object of judgment is stored in a storage portion that is provided in correspondence with the cache set selected in advance, or (2) a miss that expresses that address information of the memory region corresponding to the data that is the object of judgment is not stored in the storage portion, has occurred; and
(c) carrying out a first processing that, in a case in which it is judged in (b) that the miss has occurred, updates a miss variable that expresses a number of times that misses have occurred and stores the address information in the storage portion, or a second processing that, in a case in which it is judged that the hit has occurred, updates a hit variable that expresses a number of times that hits have occurred, wherein the plurality of data are data of a plurality of sequences, and in (b), the judgment is carried out with the respective data of each of the plurality of sequences being the data that is the object of judgment, wherein, in (b), in a case in which a value of data that is an object of judgment of one sequence among the plurality of sequences is greater than a value of data that is an object of judgment of another sequence, the judgment is carried out on the data that is the object of judgment of yet another sequence.

11. The non-transitory recording medium of claim 10, wherein the plurality of data are data of at least one sequence.

12. The non-transitory recording medium of claim 10, wherein:

the cache set has a plurality of blocks, the storage portion has a plurality of storage blocks that correspond to the plurality of blocks, and in (c), the plurality of storage blocks are rewritten such that address information of a number equal to a number of the storage blocks, including address information of the memory region corresponding to the data that is the object of judgment, are stored in order from oldest first.

13. The non-transitory recording medium of claim 11, wherein the procedure includes:

(d) in a case in which it is judged in (b) that the miss has occurred, judging whether or not the address information is stored in any of a plurality of corresponding storage portions that are provided respectively in correspondence with the storage portions and that store the address information, and in (c), carrying out a third processing that, in a case in which it is judged in (d) that the address information is stored in any of the plurality of corresponding storage portions, updates a corresponding hit variable that expresses a number of times that this judgment has been reached, or a fourth processing that, in a case in which it is judged in (d) that the address information is not stored in any of the plurality of corresponding storage portions, updates a corresponding miss variable that expresses a number of times that this judgment has been reached.

14. The non-transitory recording medium of claim 10, wherein:

a sequence hit variable that expresses a number of times that hits have occurred and a sequence miss variable that expresses a number of times that misses have occurred are determined in correspondence with each of the plurality of sequences, and in (c), in a case in which a hit occurs in any of the plurality of sequences, the sequence hit variable corresponding to the sequence is updated, and, in a case in which a miss occurs in any of the plurality of sequences, the sequence miss variable corresponding to the sequence is updated.

15. The non-transitory recording medium of claim 10, wherein:

in (b), the judgment is carried out in a predetermined order on the respective data of each of the plurality of sequences, and, for a sequence that is selected from among the plurality of sequences, the judgment is carried out in advance on each of non-judged data for which the judgment has not been carried out in the order, and in (c), for the selected sequence, in a case in which the miss occurs, the address information corresponding to the non-judged data is stored in advance in the storage portion.

16. The non-transitory recording medium of claim 15, wherein the procedure includes:

(e) in a case in which it is judged that the hit has occurred, judging whether or not the hit has occurred on the basis of the address information that is stored in advance in the storage portion and that corresponds to the non-judged data, an advance storage hit variable, that expresses a number of times that the hits have occurred, is determined on the basis of the address information that is stored in advance in the storage portion and that corresponds to the non-judged data, and in (c), in a case in which it is judged, by the hit judging section and on the basis of the address information that corresponds to the non-judged data, that the hit has occurred, the advance storage hit variable is updated.

* * * * *